United States Patent
Ahire et al.

(10) Patent No.: US 11,883,961 B2
(45) Date of Patent: Jan. 30, 2024

(54) METHOD FOR AUTONOMOUSLY DIMENSIONAL ACCURACY OF A WORKPIECE VIA THREE-DIMENSIONAL SANDING

(71) Applicant: GrayMatter Robotics Inc., Gardena, CA (US)

(72) Inventors: Avadhoot L. Ahire, Gardena, CA (US); Yi-Wei Chen, Gardena, CA (US); Satyandra K Gupta, Gardena, CA (US); Ariyan M. Kabir, Gardena, CA (US); Ashish Kulkarni, Gardena, CA (US); Ceasar G. Navarro, Jr., Gardena, CA (US); Martin G. Philo, Gardena, CA (US); Brual C. Shah, Gardena, CA (US)

(73) Assignee: GrayMatter Robotics Inc., Gardena, CA (US)

( * ) Notice: Subject to any disclaimer, the term of this patent is extended or adjusted under 35 U.S.C. 154(b) by 0 days.

(21) Appl. No.: 18/232,275

(22) Filed: Aug. 9, 2023

(65) Prior Publication Data
US 2023/0381961 A1    Nov. 30, 2023

Related U.S. Application Data

(63) Continuation-in-part of application No. 18/142,480, filed on May 2, 2023, and a continuation-in-part of
(Continued)

(51) Int. Cl.
*B24B 51/00*         (2006.01)
*B25J 11/00*         (2006.01)
(Continued)

(52) U.S. Cl.
CPC .............. *B25J 9/1653* (2013.01); *B24B 51/00* (2013.01); *B25J 9/163* (2013.01); *B25J 9/1664* (2013.01);
(Continued)

(58) Field of Classification Search
CPC ........ B25J 9/1653; B25J 9/163; B25J 9/1664; B25J 9/1679; B25J 9/1697; B25J 11/0065;
(Continued)

(56) References Cited

U.S. PATENT DOCUMENTS

2014/0088746 A1*   3/2014   Maloney ............ G05B 19/4099
                                                                     700/97
2019/0193243 A1*   6/2019   Akiyama ............... B25J 9/0096
(Continued)

*Primary Examiner* — Robert T Nguyen
(74) *Attorney, Agent, or Firm* — Run8 Patent Group, LLC; Peter Miller

(57) ABSTRACT

A method includes, during a processing cycle: navigating the sanding head across a region of a workpiece according to a toolpath; and, based on a sequence of force values output by a force sensor coupled to the sanding head, deviating the sanding head from the toolpath to maintain forces of the sanding head on the workpiece region proximal a target force. The method also includes: detecting a sequence of positions of the sanding head traversing the workpiece region; interpreting a surface contour in the workpiece region based on the sequence of positions; detecting a difference between the surface contour and a corresponding target surface defined in a target model of the workpiece; generating a second toolpath for the workpiece region based on the difference; and, during a second processing cycle, navigating the sanding head across the workpiece region according to the second toolpath to reduce the difference.

20 Claims, 5 Drawing Sheets

Related U.S. Application Data application No. 18/136,244, filed on Apr. 18, 2023, and a continuation-in-part of application No. 18/111,470, filed on Feb. 17, 2023, which is a continuation-in-part of application No. 17/829,193, filed on May 31, 2022, now Pat. No. 11,613,014, said application No. 18/136,244 is a continuation-in-part of application No. 17/829,193, filed on May 31, 2022, said application No. 18/142,480 is a continuation-in-part of application No. 17/829,193, filed on May 31, 2022, which is a continuation of application No. 17/826,840, filed on May 27, 2022.

(51) Int. Cl.

| | | |
|---|---|---|
| *B25J 9/16* | (2006.01) | |
| *G06T 1/00* | (2006.01) | |
| *B25J 13/08* | (2006.01) | |
| *G06T 7/13* | (2017.01) | |
| *G06T 7/60* | (2017.01) | |
| *G06T 19/00* | (2011.01) | |

(52) U.S. Cl.
CPC ........... *B25J 9/1679* (2013.01); *B25J 9/1697* (2013.01); *B25J 11/0065* (2013.01); *B25J 13/085* (2013.01); *G06T 1/0014* (2013.01); *G06T 7/13* (2017.01); *G06T 7/60* (2013.01); *G06T 19/00* (2013.01); *G06T 2207/10024* (2013.01); *G06T 2219/004* (2013.01)

(58) Field of Classification Search
CPC ...... B25J 13/085; B24B 51/00; G06T 1/0014; G06T 7/13; G06T 7/60; G06T 19/00; G06T 2207/10024; G06T 2219/004
See application file for complete search history.

(56) References Cited

U.S. PATENT DOCUMENTS

| | | | |
|---|---|---|---|
| 2019/0291270 A1* | 9/2019 | Kiyama | B25J 11/0065 |
| 2020/0114484 A1* | 4/2020 | Nakazono | B24B 21/08 |
| 2020/0156211 A1* | 5/2020 | Kuan | B24B 21/16 |
| 2020/0171620 A1* | 6/2020 | Aubin | B24B 49/12 |
| 2020/0269439 A1* | 8/2020 | Telleria | B25J 11/005 |
| 2020/0393524 A1* | 12/2020 | DeBiccari | G01R 33/1223 |
| 2021/0016412 A1* | 1/2021 | Nakayama | B24B 49/12 |
| 2021/0053173 A1* | 2/2021 | Tian | B25J 21/00 |
| 2021/0078135 A1* | 3/2021 | Naderer | B24B 51/00 |
| 2021/0260720 A1* | 8/2021 | Chankaramangalam | B24B 41/005 |
| 2023/0109976 A1* | 4/2023 | Nienaber | B25J 11/0065 451/28 |
| 2023/0191557 A1* | 6/2023 | Kang | B25J 11/0065 451/6 |
| 2023/0191598 A1* | 6/2023 | Koenke | G05D 15/01 700/260 |

* cited by examiner

METHOD FOR AUTONOMOUSLY DIMENSIONAL ACCURACY OF A WORKPIECE VIA THREE-DIMENSIONAL SANDING

CROSS-REFERENCE TO RELATED APPLICATIONS

This Application is a continuation-in-part of U.S. application Ser. No. 18/111,470, filed on 17 Feb. 2023, Ser. No. 18/136,244, filed on 18 Apr. 2023, and Ser. No. 18/142,480, filed on 2 May 2023, each of which is a continuation-in-part of U.S. application Ser. No. 17/829,193, filed on 31 May 2022, which is a continuation of U.S. application Ser. No. 17/826,840, filed on 27 May 2022.

TECHNICAL FIELD

This invention relates generally to the field of automated finishing and more specifically to a new and useful system and method for autonomously scanning, processing, and modeling a digital twin of a workpiece in the field of automated finishing.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
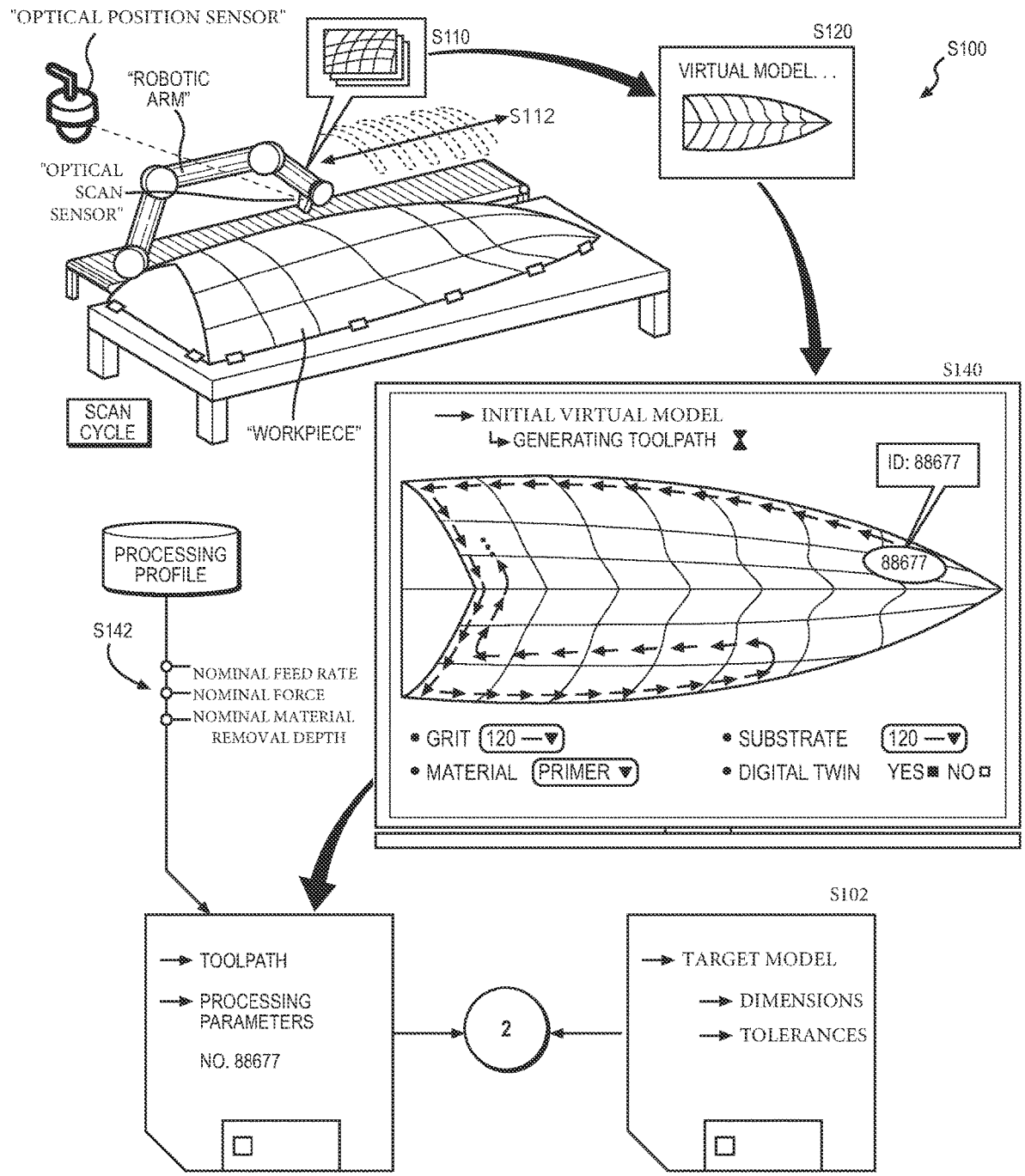
FIG. 1 is a flowchart representation of a method.
Figure 2:
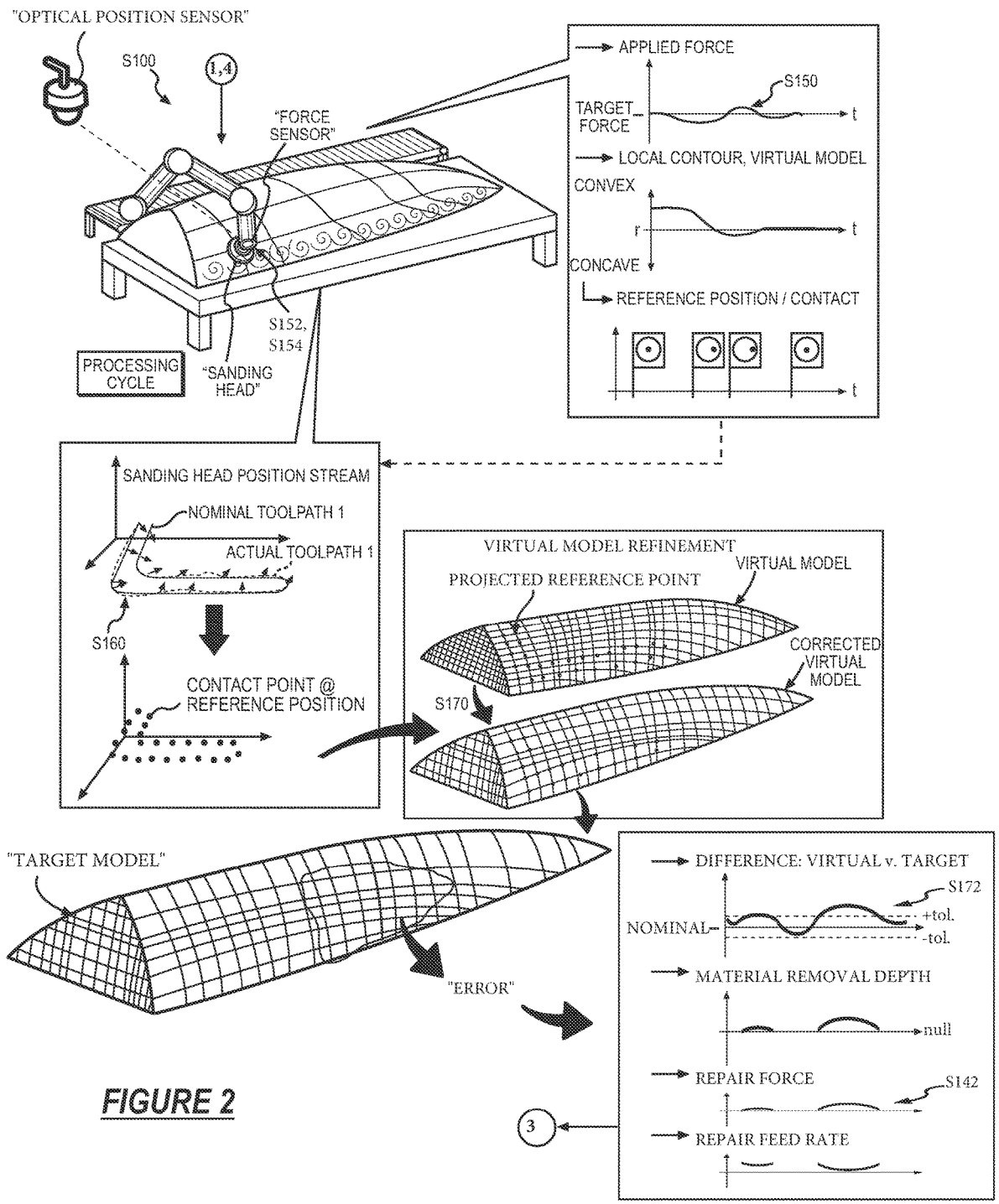
FIG. 2 is a flowchart representation of one variation of the method.
Figure 3:
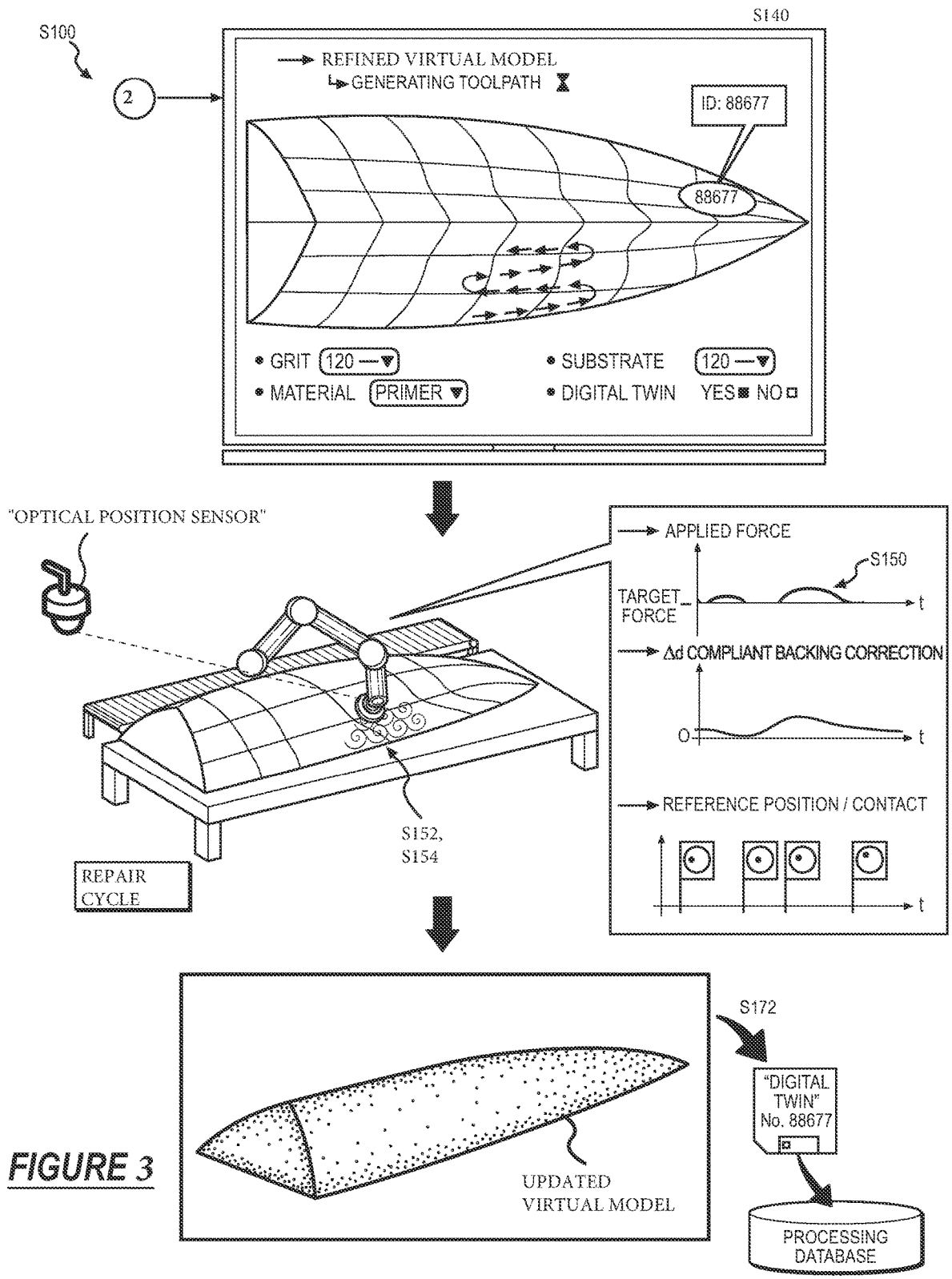
FIG. 3 is a flowchart representation of one variation of the method.

As shown in FIGS. 1, 2 and 3, a method S100 for autonomously processing a workpiece includes, during a processing cycle: navigating a sanding head across a first workpiece region of a workpiece according to a first toolpath in Block S152; and, based on a first sequence of force values output by a force sensor coupled to the sanding head, deviating the sanding head from the first toolpath to maintain forces of the sanding head on the workpiece region proximal a first target force in Block S154. The method S100 also includes: detecting a first sequence of positions of the sanding head traversing the workpiece region in Block S160; interpreting a first surface contour of the first workpiece region based on the first sequence of positions in Block S170; detecting a first difference between the first surface contour and a first target surface, corresponding to the first surface contour, defined in a target model of the workpiece in Block S172; generating a second toolpath for the first workpiece region based on the difference in Block S140; and, during a correction cycle, navigating the sanding head across the first workpiece region according to the second toolpath to reduce the difference in Block S152.

One variation of the method S100 includes: accessing a target model representing target dimensions of surfaces of a workpiece in Block S102; generating a first toolpath for a first workpiece region of the workpiece based on a geometry of the workpiece in Block S140; and assigning a first target force to the first toolpath in Block S142. This variation of the method S100 also includes, during a first processing cycle: accessing a first sequence of force values output by a force sensor coupled to a sanding head arranged on an end effector in Block S150; via a set of actuators coupled to the end effector, a) navigating the sanding head across the first workpiece region according to the first toolpath in Block S152 and b) based on the first sequence of force values, deviating the sanding head from the first toolpath to maintain forces of the sanding head on the first workpiece region proximal the first target force in Block S154; and detecting a first sequence of positions of the sanding head traversing the first workpiece region in Block S160. This variation of the method S100 further includes: interpreting a first surface contour in the first workpiece region based on the first sequence of positions in Block S170; detecting a first difference between the first surface contour and a first target surface, corresponding to the first surface contour, defined in the target model in Block S172; generating a second toolpath for the first workpiece region based on the first difference in Block S140; and, during a correction cycle, navigating the sanding head across the first workpiece region according to the second toolpath via the set of actuators in Block S152.

1.1 Variation: Correction Preceding Finishing

Figure 4:
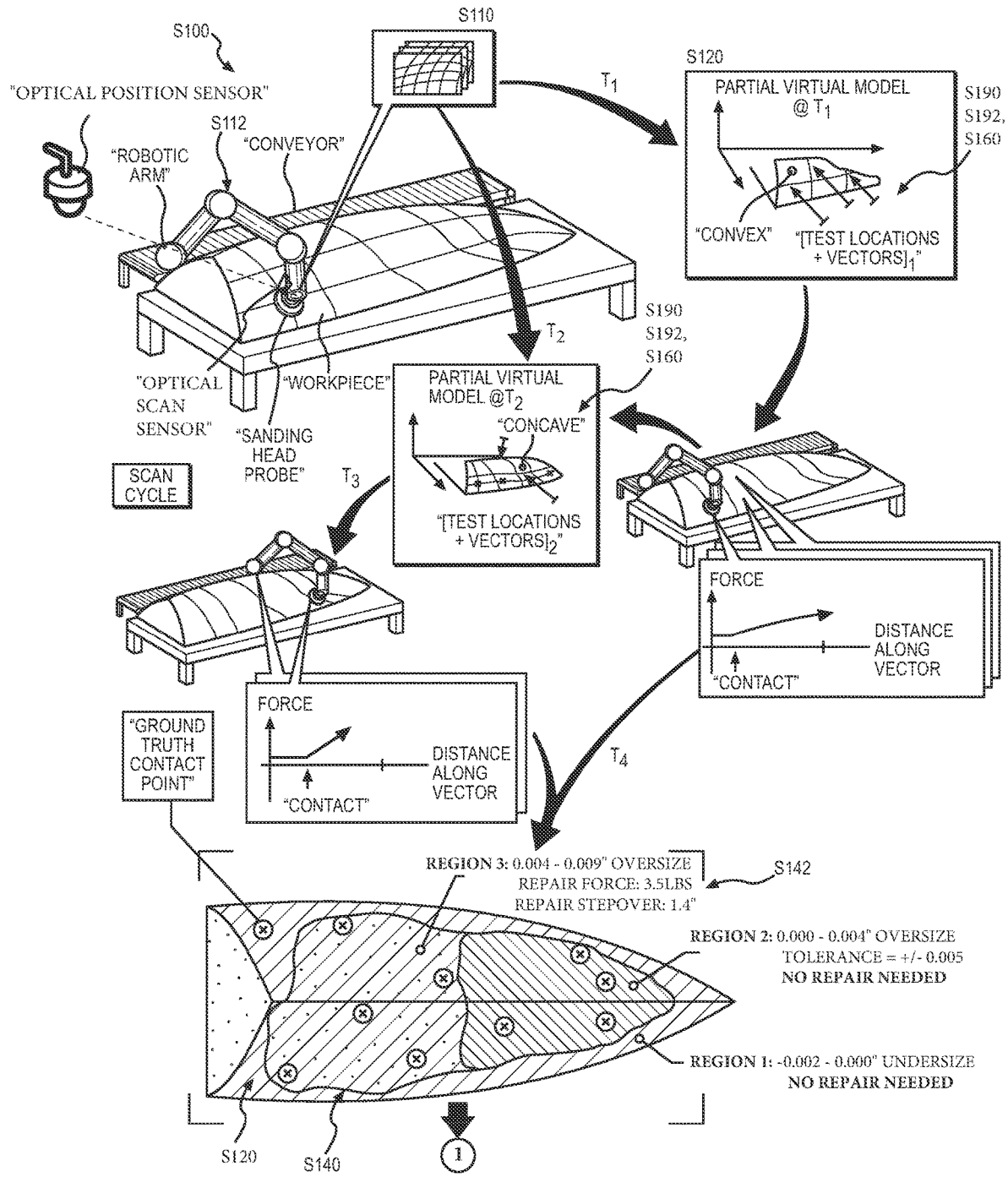
FIG. 4 is a flowchart representation of one variation of the method.

One variation of the method S100 shown in FIG. 4 includes: accessing a target model representing target dimensions of surfaces of a workpiece in Block S102; defining a set of probe locations on the workpiece in Block S190; via a set of actuators, navigating an end effector to locate a reference point in contact with the set of probe locations on the workpiece in Block S192; detecting a first sequence of positions of the reference point in contact with the workpiece at the set of probe locations in Block S160; interpreting a first surface contour of the workpiece within a first workpiece region of the workpiece based on the first sequence of positions in Block S170; and detecting a first difference between the first surface contour and a first target surface, corresponding to the first surface contour, defined in the target model in Block S172.

This variation of the method S100 also includes, in response to the first difference exceeding a threshold difference: generating a first toolpath spanning the first workpiece region in Block S140; and, during a correction cycle, navigating a sanding head, arranged on the end effector, across the first workpiece region according to the first toolpath to reduce the first difference by removing material from the first workpiece region via the set of actuators in Block S152.

This variation of the method S100 further includes: generating a second toolpath spanning the first workpiece region and a second workpiece region in Block S140; and assigning a target force to the second toolpath in Block S142. This variation of the method S100 also includes, during a processing cycle: accessing a sequence of force values output by a force sensor coupled to the sanding head in Block S150; via the set of actuators, a) navigating the sanding head across the first workpiece region and the second workpiece region according to the second toolpath in Block S152; and, based on the sequence of force values, deviating the sanding head from the second toolpath to maintain forces of the sanding head on the workpiece proximal the first target force and to finish the first workpiece region and the second workpiece region to a target surface finish in Block S154.

2. Applications

Generally, an autonomous scanning and sanding system (hereinafter the "system") can execute Blocks of the method S100: to access a high-resolution representation of target final dimensions and contours of a workpiece (or a "target model"), such as a computer-aided-drafting model of the workpiece annotated with geometric and dimensional tolerances of individual surface contours and between surfaces contours of the workpiece; to traverse a sanding head across the workpiece during a nominal processing and finishing operation; to interpret an actual surface contour of the workpiece based on positions of the sanding head during this nominal processing and finishing operation; to detect differences between this actual surface contour of the workpiece and a corresponding target surface defined in the target model (i.e., excess material on the actual surface contour versus the geometry and dimensions defined on the corresponding target surface in the target model); and to selectively traverse the sanding head across the workpiece during a secondary material removal operation to remove material from this surface contour and reduce this difference, such as to less than a dimensional tolerance assigned to the corresponding target surface in the target model.

More specifically, the system can execute Blocks of the method S100 to traverse a sanding head across the workpiece to both: grind, sand, cut, buff, or polish, etc. surfaces on a workpiece to a common surface finish; and remove material from select regions on the workpiece to increase geometric and dimensional accuracy of the workpiece, such as defined in a computer-aided-drafting model of the workpiece.

The method S100 is described herein as executed by the system to both: grind, sand, cut, buff, or polish, etc. large (e.g., complete) surface of a workpiece in order to bring this large surface to a common, consistent surface finish; and to selectively remove additional material from smaller or discrete regions on the workpiece in order to bring the regions of the workpiece into dimensional and/or geometric conformity. Additionally or alternatively, the system can execute Blocks of the method S100 solely to remove material from discrete regions on the workpiece in order to bring the regions of the workpiece into dimensional and/or geometric conformity.

2.1 Workpiece Scan

In one implementation, the system can execute Blocks of the method S100: to autonomously capture scan data of a workpiece occupying a work cell during a (rapid) contactless scan cycle; to compile these scan data into a virtual three-dimensional model exhibiting relatively low spatial or dimensional accuracy; to generate a toolpath spanning surfaces represented in the virtual model and defining a sequence of nominal positions and orientations traversable by a sanding head to sand (hereinafter "process") the workpiece; and to assign a target force for application of the sanding head on the workpiece.

The system further executes Blocks of the method S100: to track forces applied by the sanding head to the workpiece; to advance and retract the sanding head normal to the workpiece while navigating the sanding head along the toolpath to maintain forces applied by the sanding head to the workpiece at the target force during a nominal processing and finishing cycle; and to capture a series of coordinate measurements (e.g., three-dimensional positions) of a reference point (or a set of reference points, a surface, an area) on the sanding head in contact with the workpiece during this nominal processing and finishing cycle.

These coordinate measurements may thus represent true three-dimensional positions of points on real surfaces of the workpiece with greater dimensional accuracy than the initial virtual model of the workpiece generated from non-contact scan data. Accordingly, the system then: transforms (or "deforms") the virtual model of the workpiece into alignment with this sequence of coordinate measurements, thereby reducing increasing geometric and dimensional accuracy of the virtual model.

The system further: accesses a target model defining target final dimensions and contours of the workpiece (e.g., a CAD or other virtual model); aligns the target and virtual models; characterizes geometric or dimensional differences between corresponding surface contours represented in the target and virtual models; extracts corresponding geometric and/or dimensional tolerances for these surface contours from the target model; identifies select surface contours on the workpiece that contain excess material relative to geometries and/or dimensions defined in the target model and that are thus repairable via material removal; and generates secondary toolpaths that, when executed by the sanding head, remove excess material from these select surface contours to improve geometric and dimensional accuracy of the workpiece, such as bringing the workpiece into conformity with geometric and dimensional tolerances defined in the target model.

The system can then implement methods and techniques described above to: autonomously execute these secondary toolpaths during a correction cycle; capture additional coordinate measurements of the reference point on the sanding head in contact with the workpiece during this correction cycle; again refine the virtual model of the workpiece based on these additional coordinate measurements; and store this modified virtual model as a digital three-dimensional record (or "digital twin") of the workpiece.

2.1.1 Sparse Data Fusion into High-accuracy Digital Twin

Generally, the system can: rapidly scan the workpiece during the scan cycle to capture non-contact optical scan data representing the workpiece; transform these non-contact scan data into an initial virtual model representing the workpiece in a virtual three-dimensional space; and generate toolpaths—for traversing the sanding head across the workpiece—based on a surface geometry represented in this initial virtual model. The system can then: autonomously navigate the sanding head across the workpiece according to these toolpaths; implement closed-loop controls to maintain force applied by the sanding head to the workpiece at a target force by deviating the sanding head from the toolpath normal to the adjacent surface represented in this initial virtual model; and track three-dimensional positions of contact between the sanding head and the workpiece while traversing the sanding head across the workpiece. The system can then: project these three-dimensional positions of contact between the sanding pad and the workpiece into the virtual three-dimensional space; and deform (or "transform") the virtual model into alignment with these three-dimensional positions of contact, thereby refining the virtual model to reflect contact-based coordinate measurements captured by the system while processing (or "sanding") the workpiece.

More specifically, the system can refine the virtual model based on physical contact between the sanding head and the workpiece collected while autonomously processing (e.g., sanding) the workpiece during the processing cycle.

For example, the system can compile scan data collected during the scan cycle into a three-dimensional mesh. For each contact point—in a sequence of contact points between the sanding head and the workpiece—captured by the system during the subsequent processing cycle, the system can: select a target vertex in the mesh nearest the contact point; shift the target vertex—normal to the mesh at the vertex—to a new position nearest the contact point; and shift nearby vertices in the mesh to minimize changes in tangents on the surface and/or local radii at the target vertex. In a similar example, for each contact point in the sequence of contact points between the sanding head and the workpiece thus captured by the system, the system can: isolate a location on the toolpath—defined along the surface of the virtual model—corresponding to this contact point; insert a new vertex intersecting a surface defined by the mesh at this toolpath location; shift the new vertex to align with the contact point; and shift nearby vertices in the mesh to minimize changes in tangents on the surface and/or local radii at the new vertex.

In another example, the system can: generate a virtual model characterized by an initial dimensional accuracy (e.g., characterized by a tolerance of +/−0.35″) but representing the entire workpiece based on non-contact optical data captured by the system during a scan cycle; generate a nominal toolpath for the workpiece based on the virtual model; navigate the sanding head across the workpiece according to a real toolpath that may approximate the nominal toolpath but that maintains a target force between the sanding head and the workpiece, thus maintaining consistent material removal and surface finish across the workpiece; and capture sparse three-dimensional positions of a reference point on the sanding head in contact with the workpiece while autonomously sanding the workpiece. The system can then fuse the virtual model and these sparse three-dimensional positions of the reference point in contact with the workpiece to generate a digital three-dimensional record that represents the workpiece with greater dimensional accuracy (e.g., within a tolerance of +/−0.025″).

The system can further: leverage this refined virtual model to detect geometric and dimensional differences between the actual surface contours on the workpiece and corresponding target surfaces represented in a target model of the workpiece; and generate secondary toolpaths executable by the sanding head to selectively remove additional material from the workpiece to reduce these differences and increase geometric and dimensional accuracy of the workpiece.

The system can further repeat this foregoing process: to execute these secondary toolpaths during a correction cycle; to collect additional coordinate measurement data during the correction cycle; to further refine the virtual model of the workpiece based on these additional coordinate measurement data; and to store this refined virtual model as a digital twin of the workpiece upon completion of the nominal processing and finishing operation and correction cycle.

2.2 Contactless High-Accuracy Digital Twin

Additionally or alternatively, the system can: traverse an optical scanner (e.g., a two- or three-dimensional depth sensor) across the workpiece to capture high-resolution depth images depicting the workpiece during the scan cycle; track three-dimensional positions of an optical fiducial on the optical scanner—such as via a constellation of (e.g., four) time-of-flight optical sensors arranged about the system—while traversing the optical sensor across the workpiece during the scan cycle; and stitch these depth images into a high-resolution three-dimensional virtual model of the workpiece based on three-dimensional positions of the optical scanner when these depth images were captured.

(During a subsequent processing cycle, the system can implement similar methods and techniques to: traverse a sanding head across the workpiece to sand, buff, polish, or otherwise remove material from the workpiece; track three-dimensional positions of an optical fiducial on the sanding head—such as via the constellation of time-of-flight optical sensors arranged about the system—while traversing the sanding head across the workpiece during the processing cycle; track three-dimensional positions of the reference point on a sanding pad on the sanding head based on a known offset between the reference point and the optical fiducial on the sanding head.)

2.3 Probe Locations

In another implementation, the system: defines a set of probe locations across the workpiece, such as over the entire workpiece at uniform density or preferentially or exclusively in target surfaces annotated with geometric and/or dimensional tolerances in the target model of the workpiece; drives the sanding head (e.g., a reference point on a sanding pad on the sanding head or a separate touch probe arranged on the sanding head or other end effector) into contact with the workpiece at these probe locations; records coordinate measurements in response to contact between the sanding head and the workpiece at these probe locations; and interpolates actual surface contours of the workpiece based on these coordinate measurements. (Alternatively, the system can refine the virtual model described above based on these coordinate measurements.)

The system can then implement methods and techniques described above to: detect geometric and dimensional differences between actual surface contours on the workpiece and corresponding target surfaces represented in the target model of the workpiece; generate secondary toolpaths executable by the sanding head to selectively remove additional material from the workpiece to reduce these differences and increase geometric and dimensional accuracy of the workpiece; and execute these secondary toolpaths during a correction cycle to selectively remove material from the workpiece and reduce these differences.

3. System

In one implementation described in U.S. patent application Ser. No. 18/111,470 and shown in FIG. 1, the system includes: a robotic arm arranged in or adjacent a work zone and that includes a set of articulatable joints interposed between a series of arm segments; an end effector supported on a distal end of the robotic arm; a sanding head arranged on or integrated into the end effector and configured to actuate (e.g., rotate) a sanding pad; an optical sensor (e.g., a set of depth sensors and/or color cameras) arranged on or integrated into the end effector and configured to capture optical images (e.g., depth maps, photographic color images) of a workpiece; a force sensor (e.g., a one-dimensional axial force sensor) configured to output a signal representing a force applied by the sanding head to a workpiece normal to the sanding head; a set of position sensors configured to output signals representing (or assemblable into) a three-dimensional position of the end effector; a display configured to render a user interface accessible by an operator; and/or a controller configured to execute Blocks of the method S100.

In this implementation, the system can also include a conveyor configured to traverse the robotic arm longitudinally along the work zone, such as to reach and process an elongated part defining a high length-to-width ratio (e.g., a high aspect ratio), such as a boat hull or aircraft wing.

In another implementation, the system includes a multi-axis (e.g., five-axis) gantry configured to locate and articulate the end effector, sanding head, and optical sensor(s) across the work zone.

Figure 5:
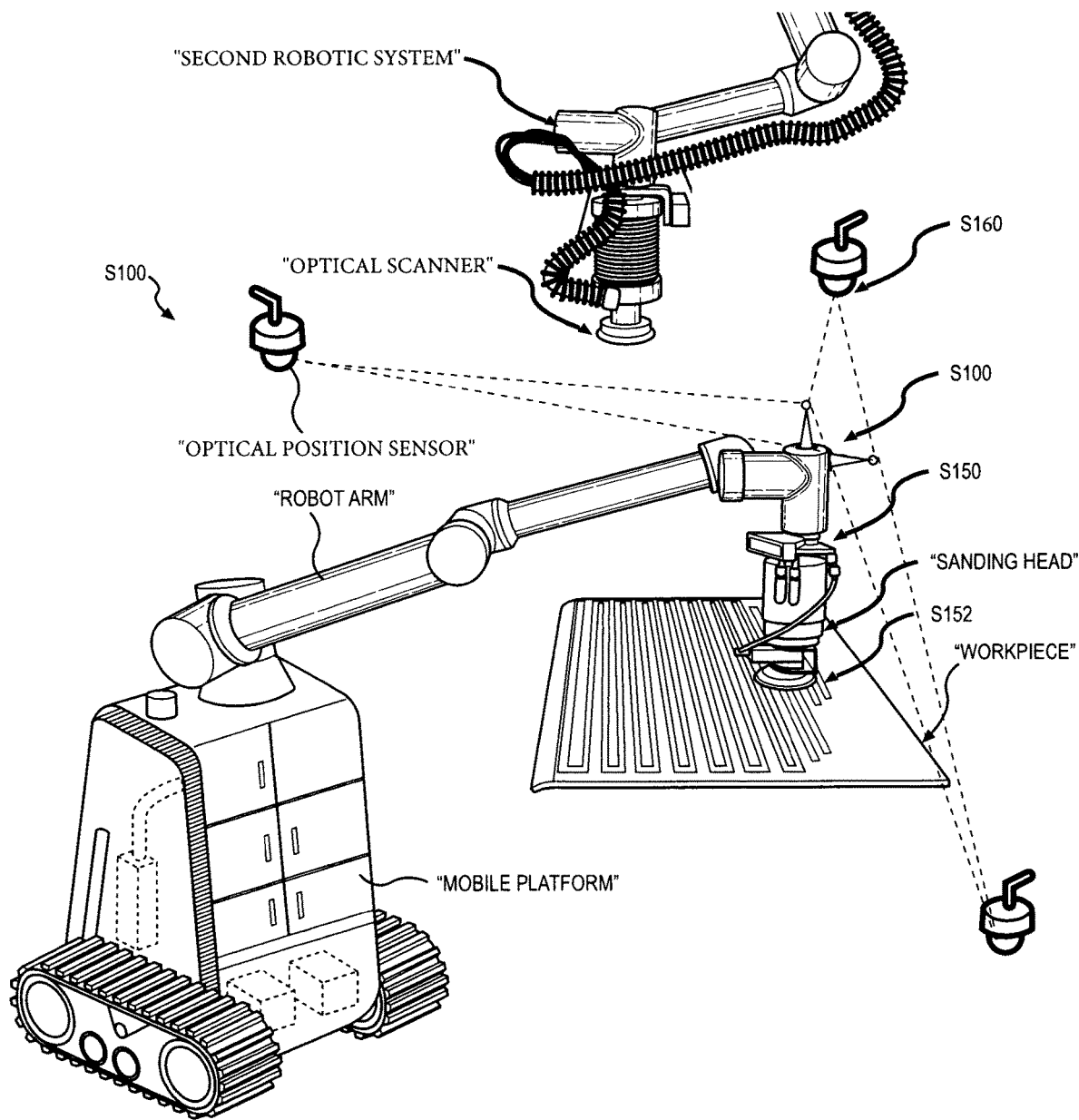
FIG. 5 is a flowchart representation of one variation of the method.

In yet another implementation shown in FIG. 5, the system includes: a mobile platform, such as including a wheeled or tracked chassis; a robotic arm arranged on the mobile platform; a sanding head (e.g., an end effector) arranged on a distal end of the robotic arm; and a navigation system. For example, the navigation system can include: a set of optical color and/or depth sensors arranged on the mobile platform and configured to capture images of a scene around the system; and a controller configured to autonomously navigate the mobile platform around a workpiece based on objects detected in images captured by these optical color and/or depth sensors.

However, the system can include or define any other element or structure.

3.1 Three-Dimensional Reference Point Tracking

In one variation shown in FIG. 5, the system includes an optical positioning system, such as including a set of fixed positions sensors arranged above the robotic arm and configured to output signals corresponding to positions of the robotic arm relative to the sensors. Accordingly, the system (e.g., the controller) can calculate (e.g., trilaterate) and track three-dimensional positions of the robotic arm, the sanding head, and/or the reference point on the sanding head during a processing cycle based on signals received from these fixed position sensors.

In one implementation, the system further includes: a set of optical fiducials arranged on the robotic arm (e.g., a constellation of optical reflectors arranged on orthogonal planes on the sanding head); a set of optical emitters (e.g., laser diodes) arranged at fixed locations about and facing the robotic arm and configured to project light (e.g., columnated infrared light) toward the robotic arm; and a set of (e.g., four or more) optical detectors arranged at fixed locations about and facing the robotic arm (e.g., each paired with an optical emitter) and configured to detect characteristics (e.g., time of flight, phase) of light reflected by the optical fiducials arranged on the robotic arm. Accordingly, the system can: collect times of flight and phases of concurrent light signals recorded by these optical detectors; derive distances from the optical detectors to each optical fiducial on the sanding head at this time based on these times of flight and phases and known offsets between the optical emitters and detectors; trilaterate the three-dimensional position of the sanding head relative to the fixed positions of the optical detectors (e.g., within a coordinate system defined relative to these optical detectors) at this time based on these distances; and derive the position of the reference point on the sanding head at this time based on a known offset between the optical fiducials on the sanding head and the reference point on the sanding head. The system can repeat the process during a processing cycle, such as at a rate of 20 Hz.

Therefore, in this implementation, the system can detect and track positions of the robotic arm, the sanding head, and/or a reference point on the sanding head by: accessing a first series of one-dimensional distances (or time of flight and/or phase representations thereof) from a first optical detector, located at a first fixed position facing the robotic arm, to an optical fiducial located on the sanding head; accessing a second series of one-dimensional distances (or time of flight and/or phase representations thereof) from a second optical detector, located at a second fixed position facing the robotic arm, to the optical fiducial located on the sanding head; and deriving a sequence of three-dimensional locations and orientations of the sanding head based on a) the first series of one-dimensional distances, b) the second series of one-dimensional distances, c) the first fixed position of the first optical detector, and d) the second fixed position of the second optical detector.

In this implementation, the system can similarly include a set of optical fiducials arranged on the workpiece. Accordingly, the system can implement similar methods and techniques to detect and track the position of the workpiece relative to the optical detectors—and thus track the position of the workpiece relative to the robotic arm—such as to detect and accommodate for changes in position of the workpiece during a processing cycle.

However, in this variation, the system: can include any other type or arrangement of external one-dimensional position or distance sensor; can track positions of the robotic arm, sanding head, or reference point on the sanding head relative to these individual external sensors based on any other type of data output by these sensors; and can implement any other method or technique to combine distances from these sensors into three-dimensional positions of the robotic arm, sanding head, and/or reference point relative to these sensors.

Additionally or alternatively, in this variation, the system: can include a constellation of one-, two-, or three-dimensional LIDAR sensors, (laser) time-of-flight distance sensors, stereoscopic cameras, depth sensors, and/or color cameras, etc. facing the robotic arm; can access one-dimensional distances or two- or three-dimensional images output by these sensors; and can derive and track three-dimensional positions of the robotic arm, the sanding head, and/or a reference point on the sanding head or sanding pad based on these distances or images. For example, the system can implement trilateration techniques to fuse one-, two-, or three-dimensional distance or depth image data into a high-resolution three-dimensional position of: a first reference point on an optical sensor arranged on the robotic arm during a scan cycle; and a second reference point on a sanding head arranged on the robotic arm during a processing cycle.

However, the system can implement any other method or technique to track three-dimensional positions of the robotic arm, sanding head, and/or reference point during a processing cycle.

3.2 Second Robotic System

In one variation shown in FIG. 5, the system includes a second robotic system (e.g., a second robotic arm, a robotic gantry)—including an optical scanner—configured to capture images (e.g., depth images) of the workpiece during a scan cycle. In particular, in this implementation, the second robotic system can autonomously capture images of the workpiece, and the optical positioning system can capture positions of the second robotic system (e.g., an optical fiducial arranged on the optical sensor on the second robotic system) during a scan cycle, as described above. The system can the implement methods and techniques described herein to assemble these images into a virtual model of the workpiece and to define a toolpath and processing parameters for the workpiece based on this virtual model. The (first) robotic system described herein can then autonomously traverse this toolpath according to these processing parameters during a processing cycle, as described herein.

However, the system can include any other type, quantity or arrangement of robotic systems and can manipulate these robotic systems in any other way to autonomously execute scan, processing, and correction cycles at a workpiece.

4. Workpiece Loading and Processing Limits

In one variation, the system retrieves processing limits and/or other parameters for autonomously sanding the workpiece.

In particular, in preparation for autonomously processing (e.g., sanding) a workpiece by the system, an operator locates the workpiece in the work zone adjacent the system. For example, the operator may: load the workpiece onto a support rig (e.g., a wheeled table) and install intermittent clamps on the workpiece to retain the workpiece on the support rig; place the support rig and workpiece into the work zone; and lock wheels of the support rig.

The system can then prompt the operator to supply processing limits for the workpiece, such as including: a maximum applied force (i.e., a maximum force applied by the sanding head to any region of the workpiece); and/or a maximum applied pressure (e.g., a maximum force applied by the sanding head to any unit area of the workpiece). For example, the operator can supply these processing limits based on known strengths and rigidity characteristics of the workpiece.

Additionally or alternatively, the system can retrieve these processing limits from a predefined processing profile. For example, the system can select a predefined processing profile stored in a processing profile database based on: a material of the workpiece (e.g., fiberglass, steel, aluminum) and/or a nominal wall thickness of the workpiece selected by the operator; or a length, aspect ratio, and/or a geometry profile of the workpiece (e.g., concave with high aspect ratio, convex with high aspect ratio, concave with low aspect ratio, convex with low aspect ratio) entered by the operator or derived from a scan of the workpiece completed by the system. The system can then load processing limits extracted from this processing profile.

However, the system can retrieve or load processing limits for the workpiece based on any other data supplied by the operator or collected autonomously by the system during a scan cycle as described below.

5. Target Model

Block S102 of the method S100 recites accessing a target model representing target dimensions of surfaces of a workpiece.

Generally, in Block S102, the system accesses (or "ingests," loads) a target model containing a three-dimensional representation of the workpiece and containing or annotated with dimensions, geometric callouts, and/or dimensional tolerances specified for individual surface, edges, and/or vertices on the workpiece upon completion of a processing cycle on the workpiece. More specifically, the system can access a target model containing geometric and dimensional specifications for the workpiece following completion of an upcoming processing cycle. The system then executes subsequent Blocks of the method S100 to traverse the sanding head across select regions of the workpiece to remove material and to bring the workpiece in conformity with these geometric and dimensional specifications for the workpiece defined in the target model.

In one implementation, the system accesses a target model containing a three-dimensional computer-aided drafting model representing target dimensions of surfaces of the workpiece. For example, the target model can include: a solid model defining a volume between virtual internal and external surfaces of the workpiece; or a mesh defining target interior and/or exterior surfaces of the workpiece. In this example, target model can also include geometric and dimensional callouts, such as tagged to or annotated on individual surfaces, edges, and/or vertices directly within the target model.

In one implementation, an operator can upload the toolpath to the system manually in preparation for processing the workpiece. Alternatively, the system can automatically retrieve the target model, such as by: detecting an identifier on the workpiece during a scan cycle executed by the system once the workpiece is loaded into a work zone adjacent the robotic arm; locating the target model, associated with this identifier, in the database; and then loading a local copy of this target model from the database.

However, the system can access a virtual model and geometric and dimensional specifications for the workpiece in any other format, at any other time, and responsive to any other trigger or input in Block S102.

6. Scan Cycle

One variation of the method S100 includes Blocks S112, S110, and S120, which recite: navigating an end effector over a workpiece; accessing a set of images captured by an optical sensor arranged on the end effector while traversing the workpiece; and compiling the set of images into a virtual model representing unloaded surfaces of the workpiece. Generally, in Blocks S112, S110, and S120, the system can implement methods and techniques described in U.S. patent application Ser. No. 18/111,470 to: autonomously navigate an optical sensor (e.g., a depth sensor and/or a color camera) over the workpiece; capture optical images (e.g., depth maps, photographic color images) of the workpiece; and assemble these optical images into a virtual three-dimensional model that represents surfaces of the workpiece within a wide dimensional accuracy (e.g., +/−0.15"), as shown in FIGS. 1 and 4.

For example, after the operator loads the workpiece into the work zone and confirms processing limits for the workpiece, the system can initiate a scan cycle. During the scan cycle, the system can: navigate the optical sensor—located on the end effector—along the scan path over and offset above the workpiece; monitor a distance between the end effector and the workpiece based on depth data collected by the optical sensor; and implement closed-loop controls to maintain a target offset distance between the optical sensor and the workpiece (e.g., 20", 50 centimeters). In this example, for a workpiece defining an elongated geometry including a long axis located approximately parallel to a longitudinal axis of the work zone, the system can actuate a conveyor supporting the robotic arm to traverse the robotic arm along the longitudinal axis of the work zone while rastering the end effector and the optical sensor laterally across the work zone to capture a sequence of optical images representing all surfaces of the workpiece accessible by a sanding head on the end effector.

The system can thus capture scan data—such as color photographic images, stereoscopic images, depth maps, and/or LIDAR images—from a set of optical sensors arranged on the end effector while traversing the end effector across (e.g., over and not in contact with) the workpiece. For example, the system can capture depth maps at a rate of 2 Hz while traversing the end effector across the workpiece at a rate of three feet per second at a target offset distance of three feet between the end effector and the workpiece, which corresponds to a nominal sensor field of view of three feet by three feet and thus yields approximately 50% overlap between consecutive depth maps captured by the system during the scan cycle.

The system then compiles these optical images into a virtual three-dimensional model of the workpiece as described in U.S. patent application Ser. No. 18/111,470, such as by implementing structure-from-motion techniques or by fusing these optical images into the virtual model based on poses of the robotic arm when these optical images were captured. For example, the system can compile this set of optical images into a three-dimensional mesh within a virtual three-dimensional space.

However, the system can implement any other methods or techniques to navigate the end effector and optical sensor over the workpiece, to collect optical images of the workpiece, and to generate a virtual three-dimensional model of the workpiece based on these optical images.

7. Target Force Parameters

Block S142 of the method S100 recites: assigning a first target force to the first workpiece region. Generally, in Block S142, the system assigns target forces to workpiece regions of the workpiece, such as: based on geometries (e.g., concave and convex contours, profiles) in these regions of the workpiece; and/or based on a material or part type of the workpiece.

In one implementation, the system retrieves a single target force from the predefined processing profile described above and assigns this target force to the entire workpiece, as shown in FIG. 1.

In another implementation, the system defines boundaries between contiguous regions of the workpiece exhibiting similar contours, such as between contiguous concave, convex, and approximately flat regions of the workpiece spanning more than a minimum surface area (e.g., four square feet). The system then assigns target forces to each region, such as: highest forces in concave regions that may be least susceptible to plastic deformation due to high force application by the sanding head; moderate forces in flat regions that may more susceptible to plastic deformation due to force application by the sanding head; lowest forces in convex regions that may be most susceptible to plastic deformation due to high force application by the sanding head; and/or force magnitudes within a region proportional to the smallest radius within the region. The system can also annotate these regions and corresponding target forces in the virtual model of the workpiece.

Additionally or alternatively, the system can: access or retrieve a compliance characteristic of a compliant backing arranged on the sanding head and supporting a sanding pad; and calculate (or adjust) a target force for a region of the workpiece proportional to this compliance characteristic. Thus, because a sanding head configured with a more compliant (i.e., less stiff) backing may distribute an applied force over a wider area of the workpiece in contact with the sanding pad, the system can assign a higher target force to each region of the workpiece.

7.1 Workpiece Segmentation

In one variation, the system segments the workpiece into workpiece regions, such as based on: geometries of the workpiece represented in the virtual model; dimensional tolerance width; and/or geometry specification or tolerance width. In another implementation, the system segments the workpiece by discrete surface contour, such as defined by edges or by geometric or dimensional callouts in the target model. The system can then define a toolpath and assign a target force within each workpiece region.

For example, the system can: define a first workpiece region containing a contiguous convex surface; define a second workpiece region containing a contiguous concave surface; and define a third workpiece region containing a contiguous surface approximating a planar geometry (e.g., defining a large effective radius); etc. In another example, the system can: define a first contiguous workpiece region characterized by high detected, predicted, or annotated stiffness; define a second contiguous workpiece region characterized by moderate detected, predicted, or annotated stiffness; and define a third contiguous workpiece region characterized by low detected, predicted, or annotated stiffness; etc.

However, the system can segment the workpiece in any other way and according to any other workpiece characteristics.

8. Tool Path Generation

The system can further implement methods and techniques described in U.S. patent application Ser. No. 18/111,470 to define a toolpath within each region of the workpiece.

In one implementation shown in FIG. 1, the system sets a first feed rate for the first region proportional to the target force assigned to the first region. The system also sets a first stepover distance between segments of a first toolpath for a first region of the workpiece: based on (e.g., proportional to) the target force assigned to this region of the workpiece; and/or proportional to a minimum radius within the first region of the workpiece. The system then: defines a serpentine or boustrophedonic toolpath within the first region of the workpiece according to the nominal stepover distance; and stores this first toolpath as a first set of keypoints, wherein each keypoint represents a vertex or other point on the toolpath, defines a three-dimensional position on the workpiece, includes a vector normal to the workpiece at this three-dimensional position, and is labeled with the target force and the feed rate set for the first region. More specifically, the system can project the first toolpath onto the first region of the workpiece represented in the virtual model, which represents the workpiece in unloaded form. The system can then extract a three-dimensional position and normal vector of each vertex or other point on the first toolpath from the virtual model. Accordingly, the system can store the first toolpath as a first ordered sequence of keypoints: located on a first unloaded surface of the workpiece stored in (i.e., represented by) the virtual model; and contained within the first workpiece region.

In one variation, the system can iteratively adjust this first toolpath based on local radii of the workpiece along segments of the first toolpath. Additionally or alternatively, the system can adjust target forces assigned to segments of the first toolpath: proportional to local radii of convex subregions of the workpiece adjacent these toolpath segments; and inversely proportional to radii of concave subregions of the workpiece adjacent these toolpath segments. Accordingly, the system can set a force greater than the nominal target force within a concave subregion of the workpiece and a target force less than the nominal target force within a convex subregion of the workpiece.

The system can repeat this process for each other region of the workpiece.

Alternatively, the system can implement the foregoing methods and techniques to generate a single continuous toolpath spanning the entire workpiece (or an entire surface of the workpiece selected for autonomous processing by the system).

9. Processing Cycle

Block S150 of the method Sim, recites accessing a first sequence of force values output by a force sensor coupled to a sanding head arranged on the end effector. Blocks S152 and S154 of the method Sim, recite, via a set of actuators coupled to the end effector: navigating the sanding head across the first workpiece region according to the first toolpath; and, based on the first sequence of force values, deviating the sanding head from the first toolpath to maintain forces of the sanding head on the first workpiece region proximal the first target force.

Generally, Blocks S150, S152, and S154 of the system can implement methods and techniques described in U.S. patent application Ser. No. 18/111,470 to autonomously navigate the sanding head along a toolpath (e.g., a sequence of keypoints) defined within a region of the workpiece and to maintain a target normal force between the sanding head and the workpiece by selectively moving the sanding head into and away from the workpiece normal to the surface of the workpiece represented in the virtual model.

The system also implements closed-loop controls to maintain a target force between the sanding head and the workpiece within each workpiece region—based on force values read from the force sensor integrated into the sanding head—by driving the sanding head toward and away from the workpiece along vectors normal to the workpiece, such as represented in keypoints of these toolpaths or extracted from the virtual model during the processing cycle. For example, for a first keypoint in the first ordered sequence of keypoints, the system can drive the set of actuators to: locate the sanding head at a first three-dimensional position intersecting the first keypoint; align an axis of the sanding head to a first vector contained in the first keypoint; and drive the sanding head, coaxial with the first vector, toward the workpiece to match force values, in a sequence of force values read from the force sensor in the sanding head, to a first target force assigned to a first toolpath containing the first keypoint. The system can then drive the set of actuators to interpolate a three-dimensional path and sanding head orientation from the first keypoint to the second keypoint while implementing closed-loop controls to apply the sanding head to the workpiece with the first target force. The system can repeat this process for each other keypoint defined along the first toolpath and then along subsequent toolpaths defined for other regions of the workpiece.

In a similar implementation, in Block S140, the system defines a first ordered sequence of keypoints located on the virtual model. For each keypoint in the first ordered sequence of keypoints, the system: calculates a vector normal to the virtual model at a location of the keypoint on the virtual model; and stores the vector in the keypoint. The system then stores the first ordered sequence of keypoints as the first toolpath. Then, for a first keypoint in the first ordered sequence of keypoints, the system: locates the sanding head at a first position intersecting the first keypoint in Block S152; aligns an axis of the sanding head to a first vector contained in the first keypoint; and drives the sanding head, coaxial with the first vector, toward the workpiece to match force values, in the first sequence of force values read from the force sensor, to the first target force in Block S154.

9.1 Contact Position Derivation

Block S160 of the method S100 recites tracking a first sequence of positions of a reference point on the sanding head traversing the first workpiece region. Generally, in Block S160, the system tracks three-dimensional positions of a reference point on the sanding head in contact with the workpiece in real space (hereinafter a "contact point").

In one implementation, the system derives a three-dimensional position of the end effector—while occupying a keypoint in the toolpath—based on: positions of each joint or actuator in the robotic arm; the position of the conveyor supporting the robotic arm; and a fixed or derived offset between the end effector and a reference point on a sanding pad supported on the sanding head.

In another implementation, the system includes an optical positioning system—such as including a constellation of optical emitters and detectors facing the robotic arm as described above—and tracks the position of the robotic arm, the sanding head, and/or the reference position on the sanding head in particular during the processing cycle via the optical positioning system. For example, the system can derive a three-dimensional position of the end effector—while occupying a keypoint in the toolpath—by: accessing a one-dimensional distance (or time of flight and/or phase representation thereof) from a first optical detector, located at a first fixed position facing the robotic arm, to an optical fiducial located on the sanding head; accessing a one-dimensional distance (or time of flight and/or phase representation thereof) from a second optical detector, located at a second fixed position facing the robotic arm, to the optical fiducial located on the sanding head; accessing a one-dimensional distance (or time of flight and/or phase representation thereof) from a third optical detector, located at a third fixed position facing the robotic arm, to the optical fiducial located on the sanding head; accessing a one-dimensional distance (or time of flight and/or phase representation thereof) from a fourth optical detector, located at a fourth fixed position facing the robotic arm, to the optical fiducial located on the sanding head; and deriving a three-dimensional location and orientation of the sanding head based on the first, second, third, and fourth one-dimensional distances and the first, second, third, and fourth fixed positions of these sensors.

In one implementation shown in FIG. 2, the system generates the toolpath containing a sequence of keypoints, each keypoint defining a vector normal to the surface represented in the virtual model at the location of the keypoint. During the processing cycle, the system traverses the sanding head along the toolpath by: interpolating normal vectors between keypoints; and maintaining the axis of the sanding head (e.g., the rotational axis of the sanding head) coaxial with normal vectors defined at and interpolated between keypoints along the toolpath. Accordingly, the system can maintain a point (or a relatively small area) on the sanding pad—proximal the axis of the sanding head—in contact with the workpiece, such as: for all convex surfaces; for all planar surfaces; and for all concave surfaces characterized by radii greater than a minimum radius controlled by compliance of a compliant backing supporting the sanding pad on the sanding head. Therefore, in this implementation, the system can record a sequence of coordinate measurements on the workpiece based on a reference point on the sanding head coincident the rotational axis of the sanding head.

In one variation, during the processing cycle, the system: defines a target axis parallel and offset from the axis of the sanding head by a target offset distance; and implements methods and techniques described above to maintain the target axis coaxial normal vectors defined at and interpolated between keypoints along the toolpath. Accordingly, the system can maintain a reference point on the sanding pad—offset from the axis of the sanding head—in contact with the workpiece. Therefore, in this implementation, the system can record a sequence of coordinate measurements on the workpiece based on a reference point on the sanding head offset from the rotational axis of the sanding head based on the target offset distance. In this variation, the system can also set a fixed target offset distance, such as 50% of the radius of the sanding pad.

Alternatively, in this variation, the system can set this target offset distance for a region of the workpiece based on a geometry of the workpiece, such as inversely proportional to an effective radius of the workpiece region such that this target offset: is approximately null for planar workpiece regions; 90% of the radius of the sanding pad for convex workpiece regions characterize by small radii; and 100% of the radius of the sanding pad for concave workpiece regions characterized by radii less than the radius of the sanding pad. Additionally or alternatively, in this variation, the system can dynamically adjust this target offset distance, such as maintaining consistent wear across the sanding pad during the processing cycle.

Accordingly, the system can: define a target axis parallel to the rotational axis of the sanding head; maintain the target axis normal to workpiece—as represented in the virtual model—while traversing the sanding head across the workpiece; and track and record real three-dimensional positions (or "coordinate measurements") of a reference point on the sanding pad coincident this target axis. For example, the system can record and store three-dimensional positions of the reference point at a pitch distance of 0.10" along the toolpath.

9.1.1 Contact Point by Workpiece Surface Profile

In one example of the foregoing variation, the system: isolates a first workpiece region defining a convex surface profile in the virtual model; generates a first toolpath defining a first continuous path across this first workpiece region of the workpiece in Block S140; sets a first target offset distance of null (i.e., 0.0") for the first workpiece region; and defines a first reference point located on a sanding pad mounted to the sanding head and coaxial with an axis of rotation of the sanding head based on the first target offset distance. While traversing the sanding head across first workpiece region, the system thus records a first sequence of positions of the first reference point in contact with the workpiece while traversing the sanding head along the first toolpath to sand the workpiece.

In this example, the system also: isolates a second workpiece region defining a concave surface profile in the virtual model; generates a second toolpath defining a second continuous path across this second workpiece region of the workpiece in Block S140; sets a second target offset distance (e.g., 50% of the radius of the sanding pad)—greater than the first target offset distance—for the second workpiece region; and defines a second reference point located on the sanding pad and offset from the axis of rotation of the sanding head according to the second target offset distance. While traversing the sanding head across this second concave workpiece region, the system thus records a second sequence of positions of the second reference point.

As described below, the system then deforms the virtual model into alignment with both the first sequence of positions of the first reference point and the second sequence of positions of the second reference point.

10. Virtual Model Correction

Block S170 of the method S100 recites interpreting a first surface contour in the first workpiece region based on the first sequence of positions. Similarly, Block S170 of the method S100 can recite deforming the virtual model into alignment with the first sequence of positions of the reference point. Generally, in Block S170, the system can adjust (or "transform") the virtual model to reflect coordinate measurements captured by the system while traversing the sanding head across the workpiece, thereby fusing the low-resolution, lower-accuracy virtual model with sparse intra-processing contact data to form a higher-resolution, higher-accuracy representation of the workpiece, as shown in FIG. 2

In particular, the system can: navigate an optical sensor—arranged on the end effector on the robotic arm—along the scan path over and offset above the workpiece during a scan cycle in Block S112; access a set of depth maps captured by the optical sensor during the scan cycle in Block S170; compile the set of depth maps into a virtual model characterized by an initial dimensional tolerance relative to a physical geometry of the workpiece in Block S170; and generate a toolpath for the workpiece based on surface contours of the workpiece represented in the virtual model in Block S140. During a subsequent scan cycle, the system: records a sequence of positions of a reference point—on the sanding head—in contact with the workpiece and representing true three-dimensional points on the first workpiece region in Block S160; and then transform the virtual model according to this sequence of positions to narrow (i.e., reduce) the initial dimensional tolerance of the virtual model and thus improve dimensional accuracy of the virtual model.

In one implementation described above, the system compiles images of the workpiece into a three-dimensional mesh within a virtual three-dimensional space in Block S120. Accordingly, in Block S170, the system: projects a set of positions—of the reference point on the sanding head recorded during the processing cycle—into the virtual three-dimensional space; selects a set of vertices in the three-dimensional mesh that correspond to this set of positions of the reference point; and snaps (i.e., moves) this set of vertices in the three-dimensional mesh onto the set of positions of the reference point within the virtual three-dimensional space.

For example, for each contact point—in the sequence of contact points between the sanding head and the workpiece—recorded by the system during the processing cycle, the system can: project a coordinate of the contact point from real space into the virtual three-dimensional space; select a target vertex in the mesh nearest this coordinate; shift the target vertex—normal to the mesh at the vertex—to a new position minimally offset from the coordinate; and shift nearby vertices in the mesh to minimize changes in tangents on the local surface of the mesh and/or to reduce changes in local radii around the target vertex.

In another implementation, the system compiles images of the workpiece into a three-dimensional surface within a virtual three-dimensional space in Block S120. Then, for each contact point in the sequence of contact points between the sanding head and the workpiece thus captured by the system, the system: isolates a location on the toolpath—defined along the surface of the virtual model in Block S140—corresponding to this contact point; inserts a vertex on the surface of the virtual model at this toolpath location; projects a coordinate of the contact point from real space into the virtual three-dimensional space; and deforms the surface of the virtual model to locate the vertex on the coordinate while minimizing changes in contours on the surface near the vertex.

Therefore, the system can fuse the virtual model, characterized by lower dimensional accuracy, with coordinate measurements captured by the system while processing (i.e., sanding) the workpiece to generate a more dimensionally accurate representation of the workpiece.

However, the system can implement any other method or technique to modify the virtual model according to coordinate measurements captured in real-time by the system while processing the workpiece.

10.1 Surface Contour Interpolation from Processing Cycle Data

In one variation, rather than deform the virtual model—generated from scan data captured during the prior scan cycle—into alignment with positions of the sanding head (or "coordinate measurements") recorded during execution of the processing cycle, the system can implement similar methods and techniques to interpolate actual surface contours on the workpiece directly from these positions of the sanding head. For example, the system can: project positions of the sanding head recorded during execution of the processing cycle into a virtual three-dimensional environment; and then construct target surfaces (or a "mesh") intersecting these positions within the virtual three-dimensional environment. The system can then implement methods and techniques described below to: align the target model with these surface contours represented in the virtual three-dimensional environment; and detect geometric or dimensional differences between target surfaces in the target model and surface contours represented in the virtual model.

10.2 Surface Contour Interpolation from Probe Cycle

Another variation of the method S100 shown in FIG. 4 includes Blocks S190 and S192, which recite: defining a set of probe locations on the workpiece; and, via a set of actuators, navigating an end effector to locate a reference point in contact with the set of probe locations on the workpiece. Generally, in Blocks S190 and S192, the system implements methods and techniques described above to: define a constellation of probe locations across the workpiece; drive the sanding head or a separate contact (or "touch") probe on the robotic arm into contact with the workpiece at these probe locations; and to record three-dimensional contact positions of the sanding head or probe—such as within a three-dimensional coordinate system of the system—upon contact with the workpiece. The system can then implement methods and techniques described above: to deform the virtual model of the workpiece—generated during a preceding scan cycle—into alignment with these three-dimensional contact positions; and/or to interpolate surface contours of the workpiece directly from these three-dimensional contact positions.

In one implementation, the system defines a uniform distribution of probe locations across the workpiece (e.g., one probe location per discrete unit area) and defines these probe locations on the target model or on the virtual model of the workpiece generated from data captured during a preceding scan cycle. Alternatively, the system: can define probe locations solely (or predominantly, preferentially) on surfaces assigned geometric or dimensional specifications in the target model; and can define higher densities of probe locations on surfaces assigned narrower (or "tighter") geometric or dimensional tolerances in the target model than surfaces assigned wider (or "looser") geometric or dimensional tolerances in the target model.

Additionally or alternatively, the system can define higher densities of probe locations near edges, vertices, or smaller features of the workpiece and then leverage three-dimensional contact positions collected during a subsequent probe cycle: to align the target model to the coordinate system of the system based on positions of corresponding edges, vertices, and smaller features represented in the target model; and/or to correct the geometry of the virtual model around the edges, vertices, and smaller features before aligning these features in the virtual model to corresponding features in the target model.

10.2.1 Probe Location Selection

Generally, in this variation, the system can: autonomously navigate the end effector over a first region of the workpiece; capture a first sequence of optical images of the first region of the workpiece; compile these images into a first segment of the virtual model representing the workpiece; define a set of (i.e., one or more) test locations in the first region of the workpiece; define an approach vector at each test location based on a geometry of the virtual model at corresponding locations; autonomously navigate the sanding head along these approach vectors and into contact with the workpiece at these locations; track forces applied by the sanding head to the workpiece; positions of the sanding head upon making contact with the workpiece at these test locations; interpret three-dimensional positions of point on the workpiece at these test locations based on these three-dimensional sanding head positions; and repeat this process for each subsequent region of the workpiece traversed by the end effector during the scan cycle. The system can therefore collect sparse empirical three-dimensional surface data of the workpiece in real-time while scanning the workpiece during the scan cycle.

In one implementation, the system can construct a partial virtual model of the workpiece and define a set of test locations on the workpiece based on local characteristics of the workpiece—defined in the virtual model—near the present location of the end effector in real-time during a scan cycle. Upon defining a test location, the system can: pause the scan cycle; calculate a vector normal to the virtual model at the test location; and navigate the end effector and thus the sanding head (or a discrete force-displacement probe arranged on the end effector) along the vector toward the test location. Once the force on the end effector outputs a signal indicating application of a force greater than a minimum threshold force, the system can: detect contact between the sanding head (or the force-displacement probe) on the workpiece; record a three-dimensional position of a point on the workpiece at this test location; withdraw the end effector from this test location on the workpiece; and repeats this process for each subsequent test location.

In one implementation, the system projects a grid defining test locations onto the workpiece, such as on fixed lateral and longitudinal pitch distances proportional to the width and length of the workpiece, respectively.

In another implementation, the system defines densities of test locations on a region of the workpiece inversely proportional to width of dimensional tolerance assigned to this region.

Then, after defining a test location in the virtual model, the system can: calculate a test axis (e.g., a vector in system coordinates) normal to the test location in the virtual model; extract a three-dimensional position of this test location in system coordinates; navigate the end effector above this three-dimensional position of this test location in system coordinates; orient the end effector to align a test axis of the end effector (e.g., a test axis of the sanding head on the end effector) to the test axis in system coordinates; and then articulate the robotic arm along (or otherwise parallel to) the test axis to move the end effector toward the three-dimensional position of this test location in the system. Concurrently, the system can access an initial sequence of force values from the force sensor in the end effector while driving the end effector along this test axis vector toward the first test location on the workpiece. Then, in response to a force value—in this initial sequence of force values—exceeding a low threshold contact force, the system can: detect initial contact between the sanding head; record a true unloaded three-dimensional position of the test location in system coordinates at the time of this initial contact; withdraw the end effector (e.g., the sanding head) from the workpiece; and then move to a next test location defined on the workpiece or resume the scan cycle.

However, the system can select another quantity or distribution of probe locations on the workpiece based on any other parameter of the target model or characteristic of the workpiece and can implement any other method or technique to refine the virtual model or directly interpolate individual contour surfaces on the workpiece based on three-dimensional contact positions recorded by the system at these probe locations.

11. Contact Position Correction

In one variation shown in FIG. 2, the system corrects contact positions of a reference point recorded in Block S160 based on forces with which the system applied the sanding head to the workpiece during the processing cycle, thereby correcting these contact positions for compression of a compliant backing supporting the sanding pad on the sanding head. The system then corrects (e.g., transforms) the virtual model according to these corrected contact positions.

11.1 Compliant Backing

In one implementation shown in FIG. 2, the system: accesses a compliance characteristic of a compliant backing supporting a sanding pad on the sanding head. Then, for a first contact position in the first sequence of contact positions recorded in Block S160, the system: records a first force applied by the sanding head on the workpiece when the reference point contacts the workpiece at the first contact position; calculates a correction offset based on (e.g., proportional to) the compliance characteristic of the compliant backing and the first force; and shifts the first contact position by the correction offset in a direction normal to a surface defined in the virtual model at the first position. The system then repeats this process for each other contact point recorded during the processing cycle in Block S160 to correct the three-dimensional positions of these contact points for compression of the compliant backing against the workpiece.

11.2 Sparse Coordinate Measurement Correction

In a similar variation shown in FIG. 3, the system can: directly probe sparse locations on the workpiece prior to the processing cycle (e.g., during the scan cycle) to record ground truth three-dimensional positions of these locations on the workpiece; correct contact points recorded in Block S160 based on these ground truth three-dimensional positions; and then deform the virtual model according to these corrected contact points in Block S170, as described above.

In one implementation, during the scan cycle, the system: defines a first probe location in a first workpiece region of the workpiece, such as based on a contour (e.g., convex or concave surface) represented in the virtual model; calculates a first vector normal to the first probe location in the first workpiece region based on the virtual model; accesses a sequence of force values from the force sensor while driving the end effector along the first vector toward the first probe location on the workpiece; records a first probe position of a reference point on the sanding head upon contact with the workpiece proximal the first probe location based on an increase in force values (e.g., from a null or tare force value) in this sequence of force values; repeats this process for other probe locations on the workpiece; and stores these probe positions as ground truth three-dimensional positions of a sparse distribution of points on the workpiece.

In this implementation, following the processing cycle, the system: identifies a first contact point—from the first sequence of contact points recorded in Block S160—proximal the first probe position recorded during the scan cycle; calculates a correction offset for the first contact point (and nearby contact points in the sequence of contact points) based on a difference between the first probe position and the first contact point; and shifts the first contact point (and nearby contact points) according to the correction offset. The system repeats this process for other contact points and probe positions recorded by the system during the scan cycle and/or the processing cycle to correct the sequence of the contact points. The system then deforms the virtual model into alignment with these corrected contact points in Block S170, as described above.

12. Interwoven Scanning+Processing+Model Correction

In another variation, the system implements methods and techniques described above to: scan a first region of the workpiece while capturing a first set of images of the workpiece; generate a virtual model representing the first region of the workpiece based on these images; generate a first toolpath spanning the first region of the workpiece based on a surface represented in the virtual model; assign a first target force to the first toolpath; autonomously navigate the sanding head across the first region of the workpiece while maintaining the first target force against the workpiece and recording a first sequence of three-dimensional of positions of a reference point on the sanding head in contact with the workpiece; and correct the virtual model according to this first sequence of positions.

In this variation, the system repeats this process for each subsequent region of the workpiece, such as including: scanning a second region of the workpiece while capturing a second set of images of the workpiece; expanding (e.g., updating) the virtual model to represent the second region of the workpiece based on these images; generating a second toolpath spanning the second region of the workpiece based on the expanded surface represented in the virtual model; assigning a second target force to the second toolpath; autonomously navigating the sanding head across the second region of the workpiece while maintaining the second target force against the workpiece and recording a second sequence of three-dimensional of positions of the reference point on the sanding head in contact with the workpiece; and correcting the virtual model according to this second sequence of positions.

For example, the system can execute the foregoing process to interleave scan and processing cycles for an elongate workpiece exhibiting a high length-to-width ratio in order to avoid multiple traversals of the elongate workpiece.

However, the system can selectively execute the scan cycle and pause the scan cycle to interleave segments of the processing cycle to process (e.g., sand) the workpiece according to any other schema.

13. Target Model Deviation Detection

Block S172 of the method S100 recites detecting a first difference between the first surface contour and a first target surface, corresponding to the first surface contour, defined in the target model. Generally, in Block S172, the system can: detect differences between surface contours represented in the virtual model (or in discrete surface contours generated by the system) and target surfaces specified and defined in the target model; characterize these differences, such as magnitudes of dimensional differences or qualities or geometric differences; and flag each surface contour in the virtual model that deviates from its corresponding target surface in the target model by more than a geometric or dimensional tolerance specified in the target model for this correspond target surface, as shown in FIG. 2.

13.1 Target Model+Virtual Model Alignment

In one variation, the system virtually aligns the target model and the virtual model of the workpiece within the three-dimensional virtual environment described above.

In one implementation, the system: projects the target model into a first position within the three-dimensional virtual environment containing the virtual model; calculates a first percentage of the target model, located in the first position, that is contained within (i.e., intersects) the virtual model (and/or a first percentage of the virtual model contained in the target model); moves the target model to a second position; calculates a second percentage of the target model, located in the second position, that is contained within the virtual model (and/or a second percentage of the virtual model contained in the target model); and iteratively repeats this process to move the target model to a final position that maximizes the percentage of the target model contained within the virtual model and/or the percentage of the virtual model contained within the target model. In this implementation, the system can then store a transform that maps the target model onto this final position in the three-dimensional virtual environment or otherwise store this final position of the target model relative to the virtual model.

In one variation, the system can further adjust a position of the target model relative to the virtual model within the three-dimensional virtual environment in order to minimize differences between a constellation of target surfaces in the target model—annotated with geometric and dimensional callouts—and corresponding surface contours represented in the virtual model. More specifically, the system can adjust the position of the target model relative to the virtual model within the three-dimensional virtual environment in order to minimize differences (e.g., errors, offsets) between specific target surfaces—containing geometric and dimensional callouts—and corresponding surface contours in the virtual model in order to minimize material removal by the system needed to bring the workpiece into compliance with these geometric and dimensional callouts.

For example, the system can: isolate a first target surface in the target model containing a first geometric or dimensional callout; isolate a corresponding (e.g., nearest) first surface contour in the virtual model; calculate a first offset volume between the first target surface and the corresponding first surface contour; (weight this offset volume inversely proportional to a width of a first tolerance assigned to the first target surface;) repeat this process for each other target surface in the target model containing a geometric or dimensional callout; and calculate a first total error for this position of the target model based on a combination (e.g., sum) of these offset (weighted) volumes. The system can then: shift the position of the target model relative to the virtual model; repeat the foregoing process to calculate a second total error; and iteratively repeat this process to move the target model to a final position that minimizes the total error (i.e., combined volume) between target surfaces in the target model and corresponding surface contours in the virtual model.

Alternatively, in this example, the system can iteratively repeat this process to move the target model to a final position—within the three-dimensional virtual environment—that locates target surfaces in the target model within offset distances of corresponding surface contours in the virtual model sufficient to fulfill a maximum quantity of target surfaces in the target model. Accordingly, the system can limit a quantity of surface contours on the workpiece flagged in Block S172 for further material removal and thus decrease processing time to complete correction of the workpiece.

In another example, the system: identifies corresponding edges and vertices in the target model and the virtual model; and implements similar methods and techniques to calculate a position of the target model—within the three-dimensional virtual environment—that minimizes offset distances (or "error") between these corresponding edges and vertices.

However, the system can implement any other method or technique to align the target model and the virtual model within the three-dimensional virtual environment.

13.2 Difference

The system can then characterize a difference between each target surface—annotated with a geometric or dimensional callout in the target model—and a corresponding surface contour represented in the target model.

In one implementation, the system: selects a first target surface containing a first dimensional tolerance callout and a corresponding first surface contour in the three-dimensional virtual environment; extracts the first dimensional tolerance (or "distance threshold") assigned to the first target surface in the target model; defines a first tolerance surface outwardly offset from the first target surface by a maximum error distance (or "threshold distance") represented by the first dimensional tolerance; isolates a first segment of the first surface contour that extends above this first tolerance surface; flags the first segment of the first contour surface for correction; and stores a first volume bounded between the first segment first contour surface and the first tolerance surface for removal. The system then repeats this process for each other target surface containing a dimensional tolerance callout.

In a similar implementation, the system: selects a first target surface containing a first geometric tolerance callout and a corresponding first surface contour in the three-dimensional virtual environment; extracts the first geometric callout assigned to the first target surface in the target model; generates a first geometric limit surface offset from the first target surface based on a geometry and dimension of the first target surface and the first geometric tolerance callout (e.g., a planar geometric limit surface for planarity callout; a cylindrical geometric limit surface for a cylindricity callout); isolates a first segment of the first surface contour that extends above this first tolerance surface; flags the first segment of the first contour surface for correction; and stores a first volume bounded between the first segment first contour surface and the first tolerance surface for removal. The system then repeats this process for each other target surface containing a geometric tolerance callout.

In another implementation, the system: selects a first target surface containing a first dimensional tolerance callout and a corresponding first surface contour in the three-dimensional virtual environment; extracts the first dimensional tolerance (or "distance threshold") assigned to the first target surface in the target model; calculates a maximum distance between the first target surface and the first surface contour; and flags the first surface contour for correction if this maximum distance exceeds the first dimensional tolerance and extends above the first target surface.

For example, the system can access a target model that includes a three-dimensional computer-aided drafting model representing target dimensions of surfaces of the workpiece in Block S102. During a scan cycle prior to the first processing cycle, the system can: traverse the end effector along a scan path offset from the workpiece; access a set of scan images captured by an optical sensor arranged on the end effector; and assemble the set of scan images into a three-dimensional mesh representing the workpiece within a virtual three-dimensional space. Following the subsequent processing cycle, the system can project the first sequence of positions into the virtual three-dimensional space; and snap a first set of vertices in the three-dimensional mesh to the first sequence of positions projected into the virtual three-dimensional space. The system can then detect a first difference between a first surface contour in the virtual model and a first target surface defined in the target model by characterizing a maximum distance between: the first surface contour represented in the three-dimensional mesh; and the first target surface defined in the target model. The system then repeats this process for each other target surface containing a dimensional tolerance callout in the target model.

In a similar example, the system accesses a target model representing a first dimensional tolerance of a first target dimension of a first surface within the first workpiece region. During a scan cycle prior to the first processing cycle, the system: traverses the end effector along a scan path offset from the workpiece; and accesses a set of depth maps captured by a depth sensor arranged on the end effector. The system then assembles the set of scan images into a virtual model: within a virtual three-dimensional space; and characterized by a dimensional accuracy, relative to the workpiece, less than the first dimensional tolerance. The system further: executes the processing cycle as described above; and records a first sequence of positions of a reference point—on the sanding head—in contact with the first workpiece region during the processing cycle and representing actual three-dimensional points on the first workpiece region; projects the first sequence of positions into the virtual three-dimensional space; and deforms the virtual model into alignment with the first sequence of positions projected into the virtual three-dimensional space to increase the dimensional accuracy of the virtual model, relative to the first workpiece region, to greater than the first dimensional tolerance. The system then detects a first difference between the first surface contour and the first target surface defined in the target model by characterizing a maximum distance between: the first surface contour represented in the virtual model; and the first target surface defined in the target model. The system then repeats this process for each other target surface containing a dimensional tolerance callout in the target model.

However, the system can implement any other method or technique: to detect a whole or partial segment of a contour surface on the workpiece—represented in the virtual model—that extends outwardly from a corresponding target surface defined in the target model by more than an assigned geometric or dimensional tolerance (hereinafter an "oversized surface contour"); and to derive a one-dimensional (e.g., normal distance, depth) and/or volumetric representation of this oversized surface contour based on this local difference between the virtual model and the target model.

14. Correction Toolpath

The system can then generate a second toolpath to correct a set of (i.e., one or more) flagged surface contours on the first workpiece region (i.e., to reduce these geometric or dimensional difference from corresponding target surfaces defined in the target model) in Block S140. In particular, the system can: implement methods and techniques described above to access or retrieve a first dimensional tolerance assigned to the first target surface defined in the target model; and generate a second toolpath for a particular workpiece region in response to a difference between a surface contour in the workpiece region and a corresponding target surface in the target model exceeding a dimensional tolerance specified for the corresponding target surface in the target model.

14.1 Correct Strategies

The system can then: extract a one-dimensional material removal depth or a three-dimensional material removal volume for an oversized surface contour based on a difference between a target surface in the target model and a corresponding contour surface in the virtual model; and implement methods and techniques described above to generate a correction toolpath and define correction parameters (e.g., target correction force, correction cycle feed rate) based on this material removal depth or volume and characteristics of the workpiece.

In one implementation, the system is configured to: autonomously navigate the sanding head over the entire workpiece during a processing cycle to remove material from the entire workpiece and achieve a nominal, consistent surface finish across the entire workpiece; then autonomously navigate the sanding head over a region of the workpiece containing an oversized surface contour during a correction cycle to remove material and correct the oversized surface contour; and then autonomously navigate the sanding head over a large region of the workpiece around and including the corrected surface contour during a second processing cycle to blend surface finishes across oversized and non-oversized regions of the workpiece.

In another implementation, the system is configured to: detect an oversized surface contour in a region of the workpiece prior to a processing cycle, such as by selectively probing the regions of the workpiece; autonomously navigate the sanding head over this region of the workpiece containing the oversized surface contour during a correction cycle to partially correct the oversized surface contour; and then autonomously navigate the sanding head over the entire workpiece during a subsequent processing cycle to remove material from the entire workpiece, complete correction of the oversized surface contour, and achieve a nominal, consistent surface finish across the entire workpiece. In this implementation, the system can: implement methods and techniques described above to calculate a nominal material removal depth from the workpiece during the processing cycle based on the output surface quality selected for the workpiece by the operator; and subtract this nominal material removal depth from the depth of the oversized surface contour to calculate a target material removal depth for partial correction of the oversized surface contour during the preceding correction cycle.

14.2 Correction Cycle Parameters

The system can then implement methods and techniques described above to set parameters for the correction cycle based on this target material removal depth or volume.

In one implementation, the system: retrieves a function that relates contact duration (i.e., a time or rotation count of a sanding disk in contact with a workpiece), applied force (or pressure), sanding disc grit, and material removal depth; segments the oversized surface contour into an array of subregions (e.g., pixels, one-inch-square areas); converts a minimum, average, or maximum depth of the three-dimensional material removal volume into a one-dimensional target material removal depth within each subregion; and calculates a target correction contact duration for each subregion based on a) the nominal target force selected for the workpiece in Block S142 described above, b) the sanding disc grit selected for the workpiece, and c) the corresponding target material removal depths of these subregions.

In this implementation, the system then sets or calculates a combination of pitch offset between legs of a correction toolpath (or "correction stepover distance") and a correction feed rate for the correction toolpath that yields target correction contact durations within each subregion of the oversized surface contour.

Therefore, the system can set a dynamic feed rate for the correction cycle for the oversized surface contour in order to achieve: greater material removal specifically over subregions the surface contour that exhibit greater deviation from the corresponding target surface defined in the target model; and less material removal in adjacent regions of the workpiece. For example, the system can specify a slowest feed rate directly over the volumetric centroid of the oversized surface contour and a feed rate that increases (e.g., linearly) as the sanding head approaches the perimeter of the oversized surface contour.

In the foregoing implementation, the system can also assign a target correction force—to the oversized surface contour—that differs from the nominal target force set for the processing cycle in Block S142 described above. For example, the system can set or calculate a target correction force—greater than the nominal target force set for the processing cycle as described above—for the oversized surface contour in order to achieve more rapid material removal from this oversized surface contour. Similarly, the system can calculate a correction feed rate—less than a nominal feed rate set for the processing cycle as described above—for the oversized surface contour in order to achieve greater material removal from the workpiece around the oversized surface contour than other non-oversized surface contours on the workpiece.

However, the system can implement any other method or technique to set or calculate processing parameters for the correction cycle for the oversized surface contour.

14.3 Correction Processing Parameter Examples

In one example shown in FIG. 2, the system: defines a pitch distance inversely proportional to a one-dimensional difference (e.g., maximum depth) or three-dimensional difference (e.g., volume) between an oversized surface contour and the corresponding target surface in the target model; and generates a correction toolpath defining a serpentine path formed by a series of interconnected toolpath legs offset by the pitch distance. During the subsequent correction cycle, the system navigates the sanding head across this oversized surface contour according to the correction toolpath to reduce this difference between the oversized surface contour and the corresponding target surface in the target model.

Additionally or alternatively, the system can define a target correction force proportional to the one-dimensional difference (e.g., maximum depth) or three-dimensional difference (e.g., volume) between the oversized surface contour and the corresponding target surface in the target model. Then, during the subsequent correction cycle, the system can: access a second sequence of force values output by the force sensor; and, based on the second sequence of force values, deviate the sanding head from the second toolpath to maintain forces of the sanding head on the oversized surface contour proximal the second target force.

14.4 Multiple Oversized Surface Contours

The system can also repeat this process to set correction parameters and generate a correction toolpath for each other oversized surface contour on the workpiece.

15. Correction Cycle

Block S152 of the method S100 recites, during a correction cycle, via a set of actuators coupled to the end effector, navigating a sanding head across the first workpiece region according to the correction toolpath in Block S152. Generally, in Block S152, the system can execute methods and techniques described above to: autonomously navigate the sanding head across a region of the workpiece—containing an oversized surface contour—according to a corresponding correction toolpath; track forces applied by the sanding head to the workpiece; and implement closed-loop controls to maintain this applied force at a target fixed or dynamic correction force assigned to the correction toolpath by deviating the sanding head from the correction toolpath along vectors normal to the workpiece, as shown in FIGS. 2 and 3.

16. Iterative Correction

In one variation, the system repeats the foregoing process: to collect a second sequence of positions of the sanding head in contact with an oversized surface contour during the correction cycle; to update the virtual model to reflect material removed from this oversized surface contour during the correction cycle based on this second sequence of positions; to recalculate a one- or three-dimensional difference between the oversized surface contour and the corresponding target surface in the target model based on this revised virtual model; to selectively generate a third toolpath and correction parameters for an additional correction cycle on the oversized surface contour if this difference still exceeds the tolerance assigned to the corresponding target surface; and to execute this additional correction cycle accordingly.

In one implementation, the system can: set a first target correction depth of 80% of a first difference between a first target surface in the target model and a first oversized surface contour on the workpiece; execute the foregoing processes to generate and execute a first toolpath to remove material from the first oversized surface contour during a first correction cycle; execute the foregoing processes to update the virtual model based on positions occupied by the sanding head occupied during the first correction cycle; recalculate a new, second difference between the first target surface in the target model and the first oversized surface contour represented in the updated virtual model; set a second target correction depth of 90% of this second difference between the first target surface in the target model and the first oversized surface contour represented in the virtual model; execute the foregoing processes to generate and execute a second toolpath to remove material from the first oversized surface contour during a second correction cycle; execute the foregoing processes to again update the virtual model based on positions occupied by the sanding head during the second correction cycle; recalculate a new, third difference between the first target surface in the target model and the first oversized surface contour represented in the updated virtual model; and confirm correction of the first oversized surface contour if this third difference is less than a dimensional tolerance assigned to the first target surface in the target model or further repeat this process if the third difference exceeds this dimensional tolerance.

For example, the system can implement methods and techniques described above: to execute a processing cycle to remove material from a large region of the workpiece; to generate or update a virtual model of the workpiece based on positions of the sanding head during the processing cycle; and to generate and execute a correction toolpath on an oversized surface contour on the workpiece during a first repeat cycle based on a difference between the oversized surface contour represented in the virtual model and a corresponding target surface represented in the target model. The system can further: access a first dimensional tolerance assigned to the first target surface defined in the target model; detect a second sequence of positions of the sanding head traversing the oversized surface contour during the first repeat cycle; interpret a revised surface contour—for the oversized surface contour—in the virtual model based on the second sequence of positions; and detect a second difference between the revised surface contour and the corresponding target surface defined in the target model. Then, in response to the second difference falling below the first dimensional tolerance, the system can confirm correction of the first workpiece region of the workpiece.

The system can therefore update the virtual model of the workpiece to reflect geometries and dimensions of the workpiece revised by the system during correction cycles.

Therefore, the system can represent a first surface contour—corrected via one or more correction toolpaths during one or more correction cycles due to deviation from the target model—in the virtual model based on a last set of sanding head positions recorded during the last correction cycle executed on this first surface contour. The system can also represent a second surface contour—not corrected during a correction cycle due to absence of a tolerance on the corresponding target surface in the target model or due to achievement of this tolerance during the prior processing cycle—in the virtual model based on sanding head positions recorded during the initial processing cycle executed by the system.

17. Digital Twin Record+Database

In one variation shown in FIG. 3, the system: stores the revised (or "corrected") virtual model as a "digital twin" of the workpiece; associates the corrected virtual model with the workpiece; annotates the corrected virtual model with processing data from the processing cycle; and/or stores the corrected virtual model in a database for later access, such as to verify dimensions, dimensional accuracy, and/or processing history of the workpiece.

In one implementation shown in FIG. 2, the system searches scan data—captured by the system during the scan cycle in Block S112—for an optical identifier (e.g., a barcode, a quick-response code, a serial number) uniquely identifying the workpiece. Upon detecting an optical identifier in these scan data, such as on the workpiece or on a tag adjacent the workpiece, the system can extract a unique identifier from this optical identifier. The system then: initializes a digital file linked to the unique identifier; writes the corrected virtual model (e.g., a digital three-dimensional record, a digital twin of the workpiece) to the digital file; and uploads the digital file to a workpiece database. The system can therefore: store a digital three-dimensional record—defining a digital twin of the workpiece—in the workpiece database; and link this digital three-dimensional record to the unique identifier detected on or adjacent the workpiece.

Additionally or alternatively, the system can: project the toolpath(s) generated in Block S140 onto the corrected virtual model; project the sequence of contact positions captured in Block S160 during the processing and/or correction cycle(s) onto the corrected virtual model; project the sequence of force values captured in Block S150 during the processing cycle on the corrected virtual model with forces; and/or project actual sanding head feed rates and speed rates implemented by the system onto corresponding regions of the corrected virtual model. However, the system can annotate the corrected virtual model with any other data collected by the system during the processing cycle in order to generate a more comprehensive processing record for the workpiece.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
during a processing cycle:
navigating a sanding head across a first workpiece region of a workpiece according to a first toolpath; and
based on a first sequence of force values output by a force sensor coupled to the sanding head, deviating the sanding head from the first toolpath to maintain forces of the sanding head on the workpiece region proximal a first target force;
detecting a first sequence of positions of the sanding head traversing the workpiece region;
interpreting a first surface contour of the first workpiece region based on the first sequence of positions;
detecting a first difference between the first surface contour and a first target surface, corresponding to the first workpiece region, defined in a target model of the workpiece;
generating a second toolpath for the first workpiece region based on the difference; and
during a correction cycle:
navigating the sanding head across the first workpiece region according to the second toolpath to reduce the difference.

2. A method comprising:
accessing a target model representing target dimensions of surfaces of a workpiece;
defining a set of probe locations on the workpiece;
via a set of actuators, navigating an end effector to locate a reference point in contact with the set of probe locations on the workpiece;
detecting a first sequence of positions of the reference point in contact with the workpiece at the set of probe locations;
interpreting a first surface contour of the workpiece within a first workpiece region of the workpiece based on the first sequence of positions;

detecting a first difference between the first surface contour and a first target surface, corresponding to the first surface contour, defined in the target model;
in response to the first difference exceeding a threshold difference:
generating a first toolpath spanning the first workpiece region; and
during a correction cycle:
via the set of actuators:
navigating a sanding head, arranged on the end effector, across the first workpiece region according to the first toolpath to reduce the first difference by removing material from the first workpiece region;
generating a second toolpath spanning the first workpiece region and a second workpiece region;
assigning a target force to the second toolpath; and
during a processing cycle:
accessing a sequence of force values output by a force sensor coupled to the sanding head; and
via the set of actuators;
navigating the sanding head across the first workpiece region and the second workpiece region according to the second toolpath; and
based on the sequence of force values, deviating the sanding head from the second toolpath to maintain forces of the sanding head on the workpiece proximal the first target force and to finish the first workpiece region and the second workpiece region to a target surface finish.

3. The method of claim 2:
further comprising extracting a dimensional tolerance of the first workpiece region from the target model;
wherein generating the first toolpath comprises generating the first toolpath in response to the first difference exceeding the dimensional tolerance by greater than a nominal material removal depth; and
wherein navigating the sanding head across the first workpiece region and the second workpiece region according to the second toolpath during the processing cycle comprises:
navigating the sanding head across the first workpiece region and the second workpiece region to remove material at the nominal material removal depth from the first workpiece region and the second workpiece region during the processing cycle.

4. A method comprising:
accessing a target model representing target dimensions of target surfaces of a workpiece;
generating a first toolpath for a first workpiece region of the workpiece based on a geometry of the workpiece;
assigning a first target force to the first toolpath;
during a first processing cycle:
accessing a first sequence of force values output by a force sensor coupled to a sanding head arranged on an end effector;
via a set of actuators coupled to the end effector:
navigating the sanding head across the first workpiece region according to the first toolpath; and
based on the first sequence of force values, deviating the sanding head from the first toolpath to maintain forces of the sanding head on the first workpiece region proximal the first target force; and
detecting a first sequence of positions of the sanding head traversing the first workpiece region;
interpreting a first surface contour in the first workpiece region based on the first sequence of positions;

detecting a first difference between the first surface contour and a first target surface, corresponding to the first surface contour, defined in the target model;
generating a second toolpath for the first workpiece region based on the first difference; and
during a second processing cycle:
via the set of actuators:
navigating the sanding head across the first workpiece region according to the second toolpath.

5. The method of claim 4, further comprising:
accessing a first dimensional tolerance assigned to the first target surface defined in the target model;
during the second processing cycle, detecting a second sequence of positions of the sanding head traversing the first workpiece region;
interpreting a revised surface contour in the first workpiece region based on the second sequence of positions;
detecting a second difference between the revised surface contour and the first target surface defined in the target model; and
in response to the second difference falling below the first dimensional tolerance, confirming correction of the first workpiece region of the workpiece.

6. The method of claim 4:
further comprising accessing a first dimensional tolerance assigned to the first target surface defined in the target model; and
wherein generating the second toolpath for the first workpiece region comprises generating the second toolpath for the first workpiece region in response to the first difference exceeding the first dimensional tolerance.

7. The method of claim 4, further comprising:
assigning a second target force, proportional to the difference, to the second toolpath; and
during the second processing cycle:
accessing a second sequence of force values output by the force sensor; and
via the set of actuators coupled to the end effector:
based on the second sequence of force values, deviating the sanding head from the second toolpath to maintain forces of the sanding head on the first workpiece region proximal the second target force.

8. The method of claim 7:
wherein generating the second toolpath for the first workpiece region comprises:
defining a pitch distance inversely proportional to the difference; and
generating the second toolpath defining a serpentine path comprising a series of interconnected toolpath legs offset by the pitch distance; and
wherein assigning the second target force to the second toolpath comprises calculating the second target force further inversely proportional to an abrasiveness of a sanding pad arranged on the sanding head; and
wherein navigating the sanding head across the first workpiece region according to the second toolpath during the second processing cycle comprises:
navigating the sanding head across the first workpiece region according to the second toolpath to reduce the difference.

9. The method of claim 4:
wherein generating the second toolpath for the first workpiece region comprises:
defining a pitch distance inversely proportional to the difference; and generating the second toolpath defining a serpentine path comprising a series of interconnected toolpath legs offset by the pitch distance; and wherein navigating the sanding head across the first workpiece region according to the second toolpath during the second processing cycle comprises:
  navigating the sanding head across the first workpiece region according to the second toolpath to reduce the difference.

10. The method of claim 4:

wherein defining the first toolpath comprises:
  defining the first toolpath comprising a first ordered sequence of keypoints located on the virtual model; and
  for each keypoint in the first ordered sequence of keypoints:
    calculating a vector normal to the virtual model at a location of the keypoint on the virtual model; and
    storing the vector in the keypoint; and wherein navigating the sanding head across the first workpiece region according to the first toolpath and deviating the sanding head from the first toolpath comprise:
  for a first keypoint in the first ordered sequence of keypoints, via the set of actuators:
    locating the sanding head at a first position intersecting the first keypoint;
    aligning an axis of the sanding head to a first vector contained in the first keypoint; and
    driving the sanding head, coaxial with the first vector, toward the workpiece to match force values, in the first sequence of force values read from the force sensor, to the first target force.

11. The method of claim 4, further comprising:

generating a third toolpath for a second workpiece region of the workpiece based on the geometry of the workpiece;

assigning a second target force to the third toolpath;

during the first processing cycle:
  accessing a second sequence of force values output by the force sensor;
  via the set of actuators:
    navigating the sanding head across the second workpiece region according to the third toolpath; and
    based on the second sequence of force values, deviating the sanding head from the third toolpath to maintain forces of the sanding head on the second workpiece region proximal the second target force; and
  detecting a second sequence of positions of the sanding head traversing the second workpiece region;
  interpreting a second surface contour in the second workpiece region based on the second sequence of positions;

during the second processing cycle, detecting a third sequence of positions of the sanding head traversing the first workpiece region;

interpreting a revised surface contour in the first workpiece region based on the third sequence of positions; and representing the second surface contour and the revised surface contour in a virtual model of the workpiece.

12. The method of claim 11:

further comprising:
  during a scan cycle prior to the first processing cycle:
    traversing the end effector along a scan path offset from the workpiece; and
    accessing a set of scan images captured by an optical sensor arranged on the end effector; and
    assembling the set of scan images into the virtual model; and wherein representing the second surface contour and the revised surface contour in the virtual model comprises transforming the virtual model into alignment with the second sequence of positions and the revised sequence of positions.

13. The method of claim 12:

wherein assembling the set of scan images into the virtual model of the workpiece comprises compiling the set of scan images into the virtual model of the workpiece comprising a three-dimensional mesh within a virtual three-dimensional space;

wherein transforming the virtual model comprises:
  projecting the second sequence of positions and the revised sequence of positions into the virtual three-dimensional space;
  snapping a first set of vertices in the three-dimensional mesh to the revised sequence of positions projected into the virtual three-dimensional space; and
  snapping a second set of vertices in the three-dimensional mesh to the second sequence of positions projected into the virtual three-dimensional space; and further comprising storing the virtual model, transformed according to the second sequence of positions and the revised sequence of positions, as a digital three-dimensional record of the workpiece.

14. The method of claim 4:

wherein accessing the target model comprises accessing the target model comprising a three-dimensional computer-aided drafting model representing target dimensions of surfaces of the workpiece;

further comprising:
  during a scan cycle prior to the first processing cycle:
    traversing the end effector along a scan path offset from the workpiece; and
    accessing a set of scan images captured by an optical sensor arranged on the end effector; and
    assembling the set of scan images into a three-dimensional mesh representing the workpiece within a virtual three-dimensional space;

wherein interpreting the first surface contour in the first workpiece region comprises:
  projecting the first sequence of positions into the virtual three-dimensional space; and
  snapping a first set of vertices in the three-dimensional mesh to the first sequence of positions projected into the virtual three-dimensional space; and wherein detecting the first difference between the first surface contour and the first target surface defined in the target model comprises characterizing a maximum distance between:
  the first surface contour represented in the three-dimensional mesh; and
  the first target surface defined in the target model.

15. The method of claim 4:

wherein accessing the target model comprises accessing the target model representing a first dimensional tolerance of a first target dimension of the first surface contour within the first workpiece region;

further comprising:
  during a scan cycle prior to the first processing cycle:
    traversing the end effector along a scan path offset from the workpiece; and accessing a set of depth maps captured by a depth sensor arranged on the end effector; and assembling the set of scan images into a virtual model:
within a virtual three-dimensional space; and
characterized by a dimensional accuracy, relative to the workpiece, less than the first dimensional tolerance;

wherein detecting the first sequence of positions comprises recording the first sequence of positions of a reference point, on the sanding head, in contact with the first workpiece region during the first processing cycle and representing actual three-dimensional points on the first workpiece region;

wherein interpreting the first surface contour in the first workpiece region comprises:
projecting the first sequence of positions into the virtual three-dimensional space; and
deforming the virtual model into alignment with the first sequence of positions projected into the virtual three-dimensional space to increase the dimensional accuracy of the virtual model, relative to the first workpiece region, to greater than the first dimensional tolerance; and wherein detecting the first difference between the first surface contour and the first target surface defined in the target model comprises characterizing a maximum distance between:
the first surface contour represented in the virtual model; and
the first target surface defined in the target model.

16. The method of claim 4:
further comprising:
during a scan cycle prior to the first processing cycle:
traversing the end effector along a scan path offset from the workpiece; and
accessing a set of scan images captured by an optical sensor arranged on the end effector;
assembling the set of scan images into a virtual model within a coordinate system of the set of actuators; and
virtually aligning the target model to the virtual model to locate the target model within the coordinate system; and
wherein generating the first toolpath comprises generating the first toolpath for the first workpiece region of the workpiece based on the geometry of the workpiece represented in the virtual model.

17. The method of claim 4, further comprising:
defining a first probe location in the first workpiece region;
calculating a first vector normal to the first probe location in the first workpiece region based on the geometry of the workpiece;
accessing a second sequence of force values from the force sensor while driving the end effector along the first vector toward the first probe location on the workpiece;
recording a first probe position of the sanding head upon contact with the workpiece proximal the first probe location based on an increase in force values in the second sequence of force values;
identifying a first position, in the first sequence of positions, proximal the first probe position;

calculating a correction offset for the first sequence of positions based on a second difference between the first probe position and the first position; and
shifting the first sequence of positions according to the correction offset.

18. The method of claim 4:
wherein generating the first toolpath comprises:
identifying the first workpiece region, defining a convex surface profile, in the geometry of the workpiece; and
generating the first toolpath defining a first continuous path across the first workpiece region of the workpiece; and
wherein detecting the first sequence of positions of the sanding head comprises detecting the first sequence of positions of a reference point while the sanding head traverses the first workpiece region, the reference point located on a sanding pad mounted to the sanding head and coaxial with an axis of rotation of the sanding head.

19. The method of claim 4, further comprising:
accessing a compliance characteristic of a compliant backing supporting a sanding pad on the sanding head; and
for a first position in the first sequence of positions:
recording a first force, in the first sequence of forces, applied by the sanding head on the workpiece when a reference point on the sanding head contacts the workpiece at the first position;
calculating a correction offset based on the compliance characteristic of the compliant backing and the first force; and
shifting the first position by the correction offset in a direction normal to the workpiece at the first position.

20. The method of claim 4:
wherein navigating the sanding head across the first workpiece region comprises navigating the sanding head across the first workpiece region via the set of actuators comprising:
a robotic arm supporting the end effector and the sanding head, the sanding head comprising an orbital sander;
wherein accessing the first sequence of force values comprises accessing the first sequence of force values output by the force sensor arranged between the end effector and the sanding head; and
wherein detecting the first sequence of positions comprises:
accessing a first series of one-dimensional distances from a first optical detector, located at a first fixed position facing the robotic arm, to an optical fiducial located on the sanding head;
accessing a second series of one-dimensional distances from a second optical detector, located at a second fixed position facing the robotic arm, to the optical fiducial located on the sanding head; and
deriving the first sequence of positions comprising three-dimensional locations and orientations of the sanding head based on:
the first series of one-dimensional distances;
the second series of one-dimensional distances;
the first fixed position; and
the second fixed position.

* * * * *

UNITED STATES PATENT AND TRADEMARK OFFICE
CERTIFICATE OF CORRECTION

| | |
|---|---|
| PATENT NO. | : 11,883,961 B2 |
| APPLICATION NO. | : 18/232275 |
| DATED | : January 30, 2024 |
| INVENTOR(S) | : Avadhoot L. Ahire et al. |

It is certified that error appears in the above-identified patent and that said Letters Patent is hereby corrected as shown below:

On the Title Page

Item (54) and in the Specification, Column 1, Lines 1-4, "METHOD FOR AUTONOMOUSLY DIMENSIONAL ACCURACY OF A WORKPIECE VIA THREE-DIMENSIONAL SANDING" should read --METHOD FOR AUTONOMOUSLY INCREASING DIMENSIONAL ACCURACY OF A WORKPIECE VIA THREE-DIMENSIONAL SANDING--

Signed and Sealed this
Twelfth Day of March, 2024

Katherine Kelly Vidal
*Director of the United States Patent and Trademark Office*